(12) United States Patent
Noh et al.

(10) Patent No.: US 8,687,583 B2
(45) Date of Patent: Apr. 1, 2014

(54) METHOD AND APPARATUS FOR COMMUNICATION IN A WIRELESS LAN SYSTEM

(75) Inventors: Yu Jin Noh, Anyang-si (KR); Yong Ho Seok, Anyang-si (KR); Bong Hoe Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 13/505,387

(22) PCT Filed: Apr. 13, 2011

(86) PCT No.: PCT/KR2011/002646
§ 371 (c)(1),
(2), (4) Date: May 1, 2012

(87) PCT Pub. No.: WO2011/129618
PCT Pub. Date: Oct. 20, 2011

(65) Prior Publication Data
US 2012/0213204 A1 Aug. 23, 2012

Related U.S. Application Data

(60) Provisional application No. 61/323,866, filed on Apr. 13, 2010, provisional application No. 61/325,382, filed on Apr. 19, 2010, provisional application No. 61/326,647, filed on Apr. 21, 2010.

(51) Int. Cl.
*H04W 36/08* (2009.01)
*H04W 84/12* (2009.01)
*H04W 72/04* (2009.01)

(52) U.S. Cl.
USPC .............. 370/329; 370/331; 370/338; 455/62

(58) Field of Classification Search
USPC ........... 370/252–254, 311–338; 455/62, 41.2, 455/509–516; 709/212–218
See application file for complete search history.

(56) References Cited

U.S. PATENT DOCUMENTS

| 7,221,681 | B2 | 5/2007 | Choi et al. | |
| 7,920,885 | B2* | 4/2011 | Singh et al. | 455/517 |
| 2002/0181426 | A1 | 12/2002 | Sherman | |
| 2004/0068551 | A1* | 4/2004 | Hymel et al. | 709/217 |
| 2004/0209634 | A1* | 10/2004 | Hrastar | 455/515 |
| 2007/0147284 | A1 | 6/2007 | Sammour et al. | |
| 2008/0137627 | A1* | 6/2008 | Fischer et al. | 370/338 |

* cited by examiner

*Primary Examiner* — Afsar M Qureshi
(74) *Attorney, Agent, or Firm* — Birch, Stewart, Kolasch & Birch, LLP

(57) ABSTRACT

A communication method in a wireless local area network (WLAN) system is provided. The communication method includes: configuring, by a first access point (AP), a first basic service set (BSS) which uses a first primary channel (P-CH) and a first secondary channel (S-CH); and configuring, by a second AP, a second BSS which uses a second P-CH, a second S-CH, a second tertiary channel (T-CH), and a second quaternary channel (Q-CH), wherein a band of the first P-CH overlaps with a band of the second P-CH, and the second P-CH is a common channel which is used in an operation of a member station of the second BSS.

20 Claims, 22 Drawing Sheets

METHOD AND APPARATUS FOR COMMUNICATION IN A WIRELESS LAN SYSTEM

CROSS REFERENCE TO RELATED APPLICATIONS

This application is the National Phase of PCT/KR2011/002646 filed on Apr. 13, 2011, which claims priority under 35 U.S.C. 119(e) to U.S. Provisional Application Nos. 61/323,866, filed on Apr. 13, 2010, 61/325,382 filed on Apr. 19, 2010 and 61/326,647 filed on Apr. 21, 2010, all of which are hereby expressly incorporated by reference into the present application.

TECHNICAL FIELD

The present invention relates to a wireless local area network (WLAN) system, and more particularly, to a method for determining a channel and for performing communication in the WLAN system.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted.

In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

An IEEE 802.11n HT WLAN system employs an HT green field physical layer convergence procedure (PLCP) protocol data unit (PPDU) format which is a PPDU format designed effectively for an HT station (STA) and which can be used in a system consisting of only HT STAs supporting IEEE 802.11n in addition to a PPDU format supporting a legacy STA. In addition, an HT-mixed PPDU format is supported as a PPDU format designed to support an HT system in a system in which the legacy STA and the HT STA coexist.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

The next generation WLAN system allows simultaneous channel access of a plurality of VHT STAs for the effective use of a radio channel. For this, multi-user multiple input multiple output (MU-MIMO)-based transmission using multiple antennas is supported. The VHT AP can perform spatial division multiple access (SDMA) transmission for transmitting spatial-multiplexed data to the plurality of VHT STAs. When data is simultaneously transmitted by distributing a plurality of spatial streams to the plurality of STAs by using a plurality of antennas, an overall throughput of the WLAN system can be increased.

The IEEE 802.11n standard represented as the existing HT WLAN system supports a transmission channel having a bandwidth of 20 MHz and 40 MHz. In addition thereto, the next generation WLAN system intends to support a transmission channel having a bandwidth of 20 MHz, 40 MHz, 80 MHz, contiguous 160 MHz, and non-contiguous 160 MHz (80+80) or a bandwidth of a broader band. To provide a throughput of 1 Gbps or higher, a feasibility test is currently being conducted for the VHT system using 4×4 MIMO and a channel bandwidth of 80 MHz or higher.

However, in general, a case where an 80 MHz bandwidth can be fully used by different communication systems or devices that use the same frequency band may be very limited. In addition, since a hotspot for providing a WLAN service is increased as the WLAN is widely used and utilized, an overlapping basic service set (OBSS) environment is increased in which a basic service area (BSA) which is a service area of that hotspot overlaps partially or fully. In the OBSS environment, in addition to the existing WLAN system, there is a need to consider a method for determining a channel to be used and for performing communication according to a channel condition of each of all available bandwidths and an apparatus for supporting the method.

SUMMARY OF INVENTION

Technical Problem

The present invention provides a method for determining a transmission channel for frame transmission and for performing communication in a wireless local area network (WLAN) system.

Technical Solution

In an aspect, a communication method in a wireless local area network (WLAN) system is provided. The method includes: configuring a first basic service set (BSS) which uses a first primary channel (P-CH) and a first secondary channel (S-CH); and configuring a second BSS which uses a second P-CH, a second S-CH, a second tertiary channel (T-CH), and a second quaternary channel (Q-CH). A band of the first P-CH overlaps with a band of the second P-CH, and the second P-CH is a common channel which is used in an operation of a member station of the second BSS.

The first P-CH and the first S-CH may have the same bandwidth, and the second P-CH, the second S-CH, the second T-CH, and the second Q-CH may have the same bandwidth.

The bandwidths may be 20 MHz.

A bandwidth of the first S-CH may overlap with a bandwidth of the second S-CH.

The second P-CH may be contiguous to the second S-CH.

The second T-CH and the second Q-CH may be allocated to a lower band than the second P-CH.

The second T-CH and the second Q-CH may be allocated to an upper band than the second P-CH.

A basic service area (BSA) which is an area for providing a service to a member station of the first BSS partially or entirely may overlap with a BSA of the second BSS.

In another aspect, a WLAN system is provided. The system includes: a first AP for configuring a first BSS which uses a first P-CH and a first S-CH; and a second AP for configuring a second BSS which uses a second P-CH, a second S-CH, a second T-CH, and a second Q-CH. A band of the first P-CH overlaps with a band of the second P-CH, and the second P-CH is a common channel which is used in an operation of a member station of the second BSS.

A bandwidth of the first S-CH may overlap with a bandwidth of the second S-CH.

The second P-CH may be contiguous to the second S-CH.

The second T-CH and the second Q-CH may be allocated to a lower band than the second P-CH.

The second T-CH and the second Q-CH may be allocated to an upper band than the second P-CH.

A BSA which is an area for providing a service to a member station of the first BSS may partially or entirely overlap with a BSA of the second BSS.

Advantageous Effects

According to one embodiment of the present invention, a method capable of effectively selecting a broadband transmission channel in an overlapping BSS (OBSS) environment is provided, thereby being able to improve a throughput of a wireless local area network (WLAN) system.

According to one embodiment of the present invention, a data frame can be transmitted by changing a transmission channel depending on a channel state, thereby being able to improve a throughput of a WLAN system.

MODE FOR INVENTION

Hereinafter, an embodiment of the present invention will be described in detail with reference to the accompanying drawings.

A wireless local area network (WEAN) system according to an embodiment of the present invention includes at least one basic service set (BSS). The BSS is a set of stations (STAs) successfully synchronized to communicate with one another. The BSS can be classified into an independent BSS (IBSS) and an infrastructure BSS.

The BSS includes at least one STA and an access point (AP). The AP is a functional medium for providing a connection to STAs in the BSS through respective wireless media. The AP can also be referred to as other terminologies such as a centralized controller, a base station (BS), a scheduler, etc.

The STA is any functional medium including a medium access control (MAC) and wireless-medium physical layer (PHY) interface satisfying the institute of electrical and electronics engineers (IEEE) 802.11 standard. The STA may be an AP or a non-AP STA. Hereinafter, the STA refers to the non-AP STA unless specified otherwise.

The STA can be classified into a VHT-STA, an HT-STA, and a legacy (L)-STA. The HT-STA is an STA supporting IEEE 802.11n. The L-STA is an STA supporting a previous version of IEEE 802.11n, for example, IEEE 802.11a/b/g. The L-STA is also referred to as a non-HT STA.

Figure 1:
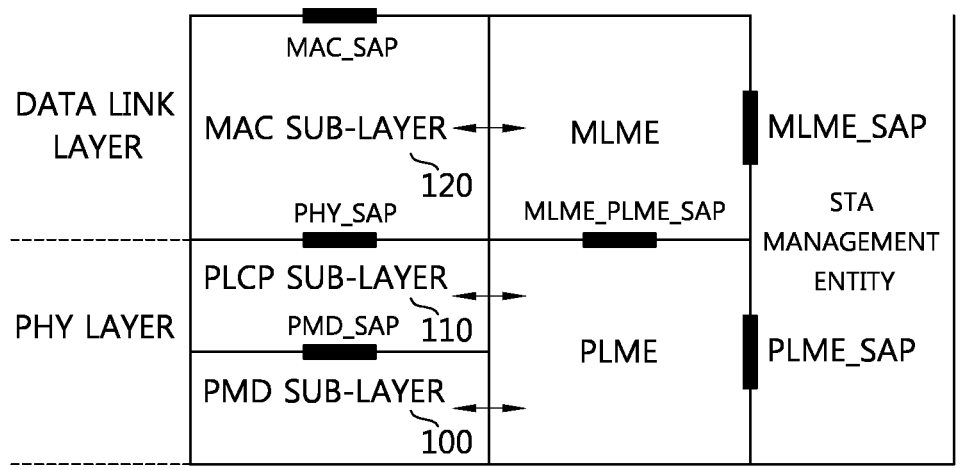
FIG. 1 shows a physical layer architecture of a WLAN system supported by IEEE 802.11.

FIG. 1 shows a physical layer architecture of a WLAN system supported by IEEE 802.11.

The IEEE 802.11 PHY architecture includes a PHY layer management entity (PLME), a physical layer convergence procedure (PLCP) sub-layer 110, and a physical medium dependent (PMD) sub-layer 100. The PLME provides a PHY management function in cooperation with a MAC layer management entity (MLME). The PLCP sub-layer 110 located between a MAC sub-layer 120 and the PMD sub-layer 100 delivers to the PMD sub-layer 100 a MAC protocol data unit (MPDU) received from the MAC sub-layer 120 under the instruction of the MAC layer, or delivers to the MAC sub-layer 120 a frame received from the PMD sub-layer 100. The PMD sub-layer 100 is a lower layer of the PDCP sub-layer and serves to enable transmission and reception of a PHY entity between two STAs through a radio medium. The MPDU delivered by the MAC sub-layer 120 is referred to as a physical service data unit (PSDU) in the PLCP sub-layer 110. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 110 attaches an additional field including information required by a PHY transceiver in a process of receiving a PLCP service data unit (PSDU) from the MAC sub-layer 120 and delivering it to the PMD sub-layer 100. The additional field attached to an MPDU in this case may be a PLCP preamble, a PLCP header, tail bits required on a data field, etc. The PLCP preamble serves to allow a receiver to prepare a synchronization function and antenna diversity before the PSDU is transmitted. The PLCP header includes a field including information on a PPDU to be transmitted, which will be described below in greater detail with reference to FIG. 2.

The PLCP sub-layer 110 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data.

Figure 2:
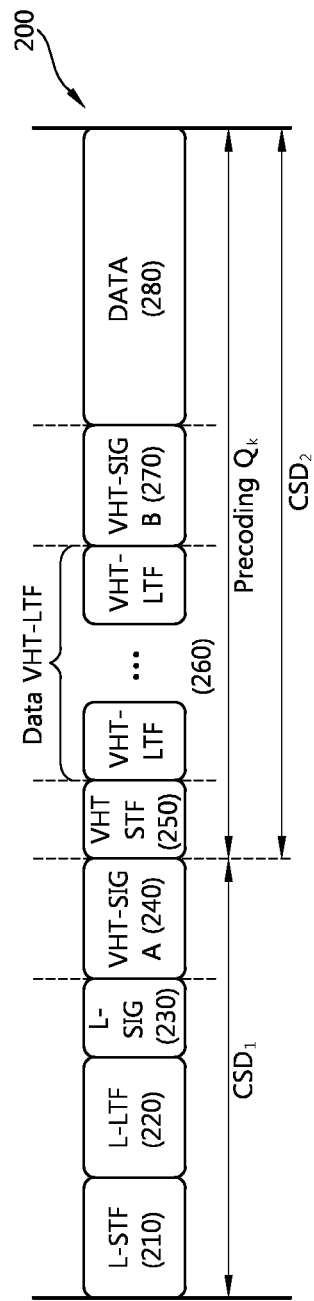
FIG. 2 is a diagram showing an example of a PPDU format used in a WLAN system of the present invention.

FIG. 2 is a diagram showing an example of a PPDU format used in a WLAN system of the present invention.

Referring to FIG. 2, a PPDU 200 includes an L-STF field 210, an L-LTF field 220, an L-SIG field 230, a VHT-SIGA field 240, a VHT-STF field 250, a VHT-LTF field 260, a VHT-SIGB field 270, and a data field 280.

A PLCP sub-layer constituting a PHY converts a PSDU delivered from a MAC layer into the data field 280 by appending necessary information to the PSDU, generates the PPDU 200 by appending several fields such as the L-STF field 210, the L-LTF field 220, the L-SIG field 230, the VHT-SIGA field 240, the VHT-STF field 250, the VHT-LTF field 260, the VHT-SIGB field 270, or the like, and delivers the PPDU 200 to one or more STAs through a physical medium dependent (PMD) layer.

The L-STF 210 is used for frame timing acquisition, automatic gain control (AGC) convergence, coarse frequency acquisition, etc.

The L-LTF field 220 is used for a frequency offset and channel estimation for demodulation of the L-SIG field 230 and the VHT-SIGA field 240.

The L-SIG field 230 is used when the L-STA receives the PPDU 200 to acquire data.

The VHT-SIGA field 240 includes control information for interpreting the received PPDU 200 as common control information required for VHT-STAs which are MIMO-paired with an AP. The VHT-SIGA field 240 includes information on a spatial stream for each of the plurality of MIMO-paired STAs, bandwidth information, identification information related to whether space time block coding (STBC) is used, a group identifier for an STA group, information on an STA to which each group identifier is allocated, and information related to a short guard interval (GI). Herein, the group identifier for the STA group may include whether a currently used MIMO transmission method is MU-MIMO or SU-MIMO.

The VHT-STF field 250 is used to improve performance of AGC estimation in MIMO transmission.

The VHT-LTF field 260 is used when the STA estimates a MIMO channel. Since the VHT WLAN system supports MU-MIMO, the VHT-LTF field 260 can be configured by the number of spatial streams in which the PPDU 200 is transmitted. In addition, when full channel sounding is supported and is performed, the number of VHT-LTFs may increase.

The VHT-SIGB field 270 includes dedicated control information required when the plurality of MIMO-paired STAs receive the PPDU 200 to acquire data. Therefore, the STA may be designed such that the VHT-SIGB field 270 is decoded only when the common control information included in the VHT-SIGB field 270 indicates that the currently received PPDU 200 is transmitted using MU-MIMO transmission. On the contrary, the STA may be designed such that the VHT-SIGB field 270 is not decoded when the common control information indicates that the currently received PPDU 200 is for a single STA (including SU-MIMO).

The VHT-SIGB field 270 includes information on each STA's modulation, encoding, and rate-matching. A size of the VHT-SIGB field 270 may differ according to a MIMO transmission type (MU-MIMO or SU-MIMO) and a channel bandwidth used for PPDU transmission.

The data field 280 includes data to be transmitted by the AP and/or the STA. More particularly, the data field may include a service field, a PSDU including data, a tail bit, and a padding bit. The service field is a field for initializing a scrambler used in a PPDU generation process. The tail bit may be configured with a bit sequence required to return a convolution encoder to a state '0'. A bit size allocated to the tail field may be in proportion to the number of binary convolutional code (BCC) encoders used to encode data to be transmitted.

The PSDU may be a MAC protocol data unit (MPDU) or aggregate MPDU (A-MPDU) which is a data unit delivered from a MAC layer. A size of a bit sequence constituting the PSDU may be expressed by a value of a length sub-field included in the VHT-SIG field.

The padding field consists of bits for filling a bit space which remains when a bit size to be allocated for each OFDM is not satisfied even if bits constituting the PSDU and a bit constituting the tail field are included in a last symbol among a plurality of OFDM symbols transmitted by allocating the PPDU.

Hereinafter, the embodiment of the present invention will be described by using terms 'channel' and 'transmission channel'. In the present invention, the channel refers to a unit radio medium that can be used for frame transmission and/or reception between an AP and/or an STA and the STA, and has a characteristic in that it is allocated to have a constant bandwidth in a specific frequency band. In the embodiment of the present invention, the channel can be allocated to a 20 MHz bandwidth. The transmission channel refers to a radio medium which is used for frame transmission and/or reception by an AP and/or an STA and another STA. The transmission channel can consist of a group of at least one channel. Hereinafter, a data frame can be used in the concept of including the aforementioned PPDU.

Figure 3:
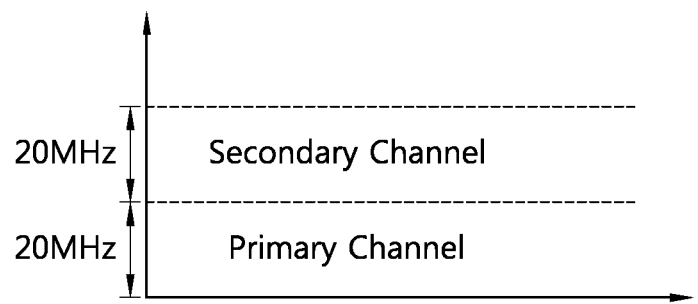
FIG. 3 shows an example of a channel that can be used in an HT WLAN system supporting a 40 MHz bandwidth.

FIG. 3 shows an example of a channel that can be used in an HT WLAN system supporting a 40 MHz bandwidth.

The HT WLAN system supports 20 MHz and 40 MHz as a transmission channel bandwidth that can be used by an AP and/or an STA. A transmission channel having a 40 MHz bandwidth consists of two channels each having a 20 MHz bandwidth. One of the two channels is called a primary channel (P-CH), and the other is called a secondary channel (S-CH). The P-CH is a channel used by STAs which are member STAs included in a basic service set (BSS) configured by the AP to operate the STAs. The S-CH is a 20 MHz channel adjacent to a P-CH used for the purpose of creating a 40 MHz channel.

In the HT WLAN system, the AP provides the STA with information on a transmission channel for frame transmission. In this case, the information may include a bandwidth of an available transmission channel and information on a P-CH and an S-CH. The P-CH and the S-CH are adjacent to each other. Therefore, the information on the S-CH may include a value indicating whether it is an upper band or a lower band than the P-CH.

Figure 4:
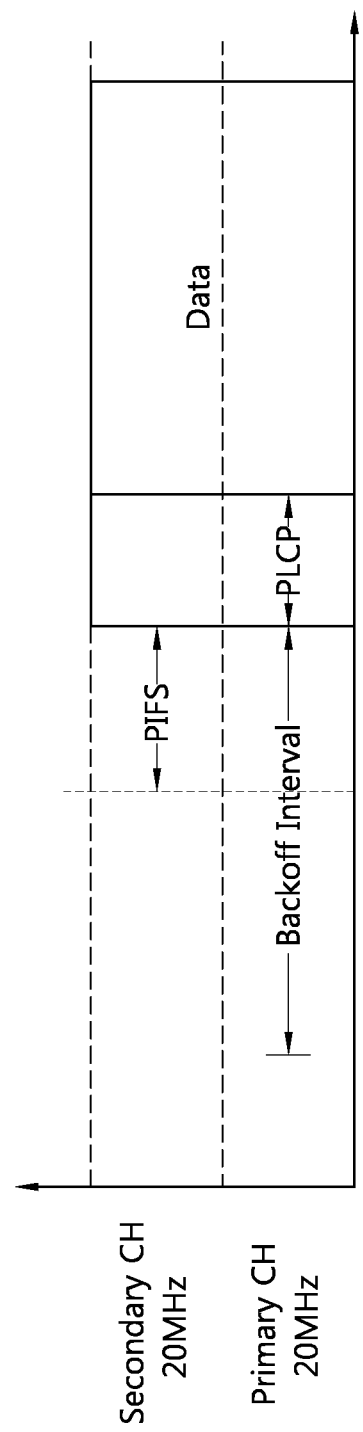
FIG. 4 shows a frame transmission method in a WLAN system supporting a 40 MHz bandwidth.

FIG. 4 shows a frame transmission method in a WLAN system supporting a 40 MHz bandwidth.

Referring to FIG. 4, an AP and/or an STA can transmit a data frame by using 40 MHz if an S-CH is in an idle state during a point coordinator function (PCF) interframe space (PIFS) which is a minimum frame interval before an expiry of a counter of a backoff performed to obtain a channel access opportunity. In this case, a PLCP header including control information required to obtain data through demodulation and decoding by receiving a data frame in a receiving end can be configured such that it is transmitted through a 20 MHz bandwidth P-CH.

If a channel access is difficult because a corresponding channel is frequently occupied or if a channel condition is not good because a noise and interference acting on the channel has a great effect, information indicating channel switching can be transmitted to the STA. In the channel switching, there may be a case where, when a P-CH needs to be changed, the P-CH is maintained and only an S-CH is changed. Therefore, the information indicating the channel switching may include sub-information indicating the P-CH, sub-information indicating at which position the S-CH exists with respect to the P-CH, and sub-information related to a time point at which the channel switching is applied. Channel switching information may be included in a channel switching announcement frame, which is one type of an action frame, and a beacon frame periodically transmitted by the AP to transmit control information required for frame transmission to the paired STA.

There may be a case where a new AP intends to configure a new BSS in a situation where an existing BSS configured by an existing AP is present. In order for the AP to configure the new BSS, scanning is necessary to know which channel is used by existing BSSs. When a basic service area (BSA) of the existing BSS overlaps with a BSA of the new BSS, a problem may arise in channel selection of each BSS. For this, when the P-CH and the S-CH of the new BSS newly configured by the AP are determined, the HT WLAN system considers an influence acting on the P-CH and/or the S-CH of the existing BSS in terms of a throughput and a fairness. Therefore, channel selection of each BSS in an overlapping BSS (OBSS) situation can be regulated according to a channel selection rule as shown in Table 1 below. Herein, BSS1 denotes the existing BSS, and BSS2 denotes the new BSS.

TABLE 1

| BSS 2 | BSS 1 | |
|---|---|---|
| | Primary Channel | Secondary Channel |
| Primary Channel | ○ | X |
| Secondary Channel | X | ○ |

First, it is assumed that the BSS1 supports 20 MHz. The BSS2 selects a band of a 40 MHz transmission channel such that an S-CH to be used by the BSS2 is not the same band as a P-CH of the BSS1. Next, it is assumed that the BSS1 supports 20 MHz/40 MHz. In this case, the BSS2 must select a channel such that a P-CH to be used by the BSS2 is not the same as the S-CH of the BSS1 and the S-CH is not the same band as the P-CH of the BSS1. Accordingly, a fairness of the BSS1 and the BSS2 in frame transmission can be ensured to some extent.

Meanwhile, when repetitive data is transmitted through a different frequency block, the data can be transmitted by multiplexing any complex value in order to decrease a peak to average power ratio (PAPR). Transmission using the frequency block in the HT WLAN system can be as shown in FIG. 5.

Figure 5:
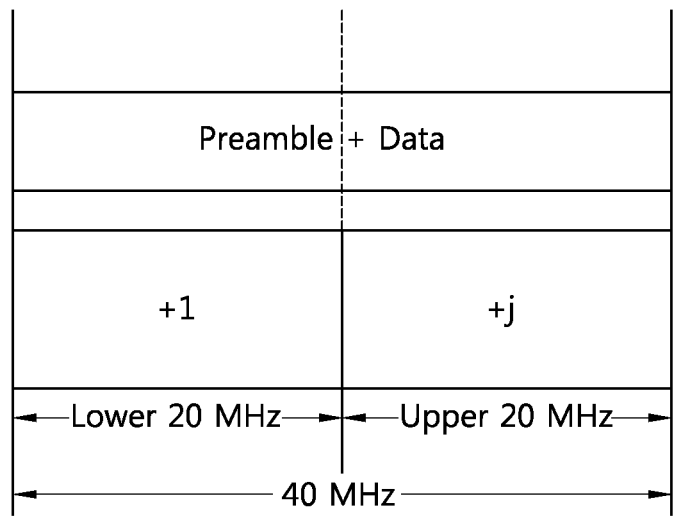
FIG. 5 shows an example of applying a sequence for decreasing a PAPR in an HT WLAN system.

FIG. 5 shows an example of applying a sequence for decreasing a PAPR in an HT WLAN system.

Referring to FIG. 5, data is transmitted in such a manner that data transmitted through a frequency block corresponding to a lower 20 MHz in a full frequency band is multiplied by +1 and data transmitted through a frequency block corresponding to an upper 20 MHz is multiplied by +j. That is, the PAPR can be decreased by using a length-2 sequence of $\{+1, +j\}$.

Meanwhile, in order to provide a throughput of 1 Gbps or higher, the next generation WLAN system intends to support a transmission channel bandwidth of 80 MHz, contiguous 160 MHz, non-contiguous 160 MHz (80+80 MHz), and higher. For this reason, it is expected that four or more contiguous 20 MHz channels will be used.

Figure 6:
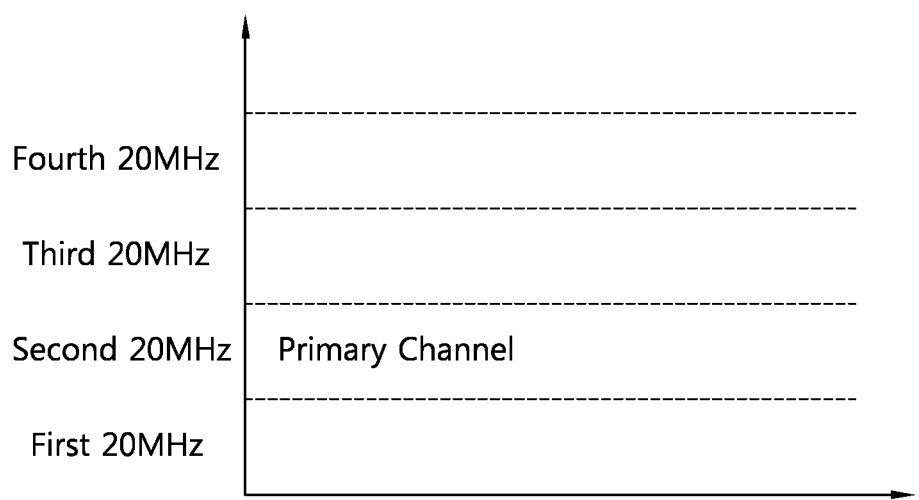
FIG. 6 shows an example of using a channel of a WLAN system supporting an 80 MHz bandwidth.

FIG. 6 shows an example of using a channel of a WLAN system supporting an 80 MHz bandwidth.

Referring to FIG. 6, a first channel CH1, a second channel CH2, a third channel CH3, and a fourth channel CH4 each have a 20 MHz bandwidth, and are present in adjacent locations. An AP and/or an STA can transmit and receive data by using a channel having a 20 MHz, 40 MHz, or 80 MHz bandwidth according to a channel usage state.

In case of 20 MHz data frame transmission, the AP can determine a primary channel (P-CH) and can select the P-CH as a transmission channel. As shown in FIG. 6, the AP can select a CH2 as the P-CH, and can transmit a 20 MHz data frame to the STA by using the CH2. In this case, the AP and/or the STA which intend to transmit a data frame determine whether the CH2 which is the P-CH is in an idle state on the basis of a carrier sense multiple access with collision avoidance (CSMA/CA) mechanism, and if it is in the idle state, perform data frame transmission.

In case of 40 MHz data frame transmission, the AP determines the P-CH similarly to the aforementioned case of 20 MHz data frame transmission. The P-CH can be determined to any one of the channels CH1, CH2, CH3, and CH4, and can be determined to a middle channel other than a boundary channel (i.e., the channel CH1 or CH4) among all channel bands including the channels CH1 to CH4 as shown in the figure. The S-CH can be determined to a channel adjacent to the determined P-CH, that is, to the channel CH1 or CH3 in the figure. The AP can signal bandwidth information of a transmission channel to be used, information on the P-CH, and information on the S-CH to the STA. Herein, the information on the S-CH may be information indicating whether the S-CH is an upper band or a lower band than the P-CH. If the P-CH is in an idle state, the AP can determine that the S-CH is also in the idle state and then can transmit a data frame by using a 40 MHz transmission channel including the P-CH and the S-CH.

In case of 80 MHz data frame transmission, the AP can determine the P-CH and can determine one of channels adjacent to the P-CH as the S-CH. The P-CH can be determined to any one of the channels CH1, CH2, CH3, and CH4, and can be determined to a middle channel other than a boundary channel (i.e., the channel CH1 or CH4) among all channel bands including the channels CH1 to CH4 as shown in the figure. The S-CH can be determined to a channel adjacent to the determined P-CH, that is, to the channel CH1 or CH3 in the figure. The remaining two 20 MHz channels other than the P-CH and the S-CH among the channels constituting the 80 MHz transmission channel can be respectively referred to as a tertiary channel (T-CH) and a quaternary channel (Q-CH). If the CH2 is determined to the P-CH and the CH1 is determined to the S-CH, the T-CH and the Q-CH can be determined to the CH3 and the CH4. Optionally, the T-CH and the Q-CH can be collectively referred to as a 40 MHz S-CH, and in this case, a 20 MHz P-CH and a 20 MHz S-CH can be collectively referred to as a 40 MHz P-CH.

The AP determines that the selected P-CH is in the idle state on the basis of the CSMA/CA mechanism, and if the remaining three 20 MHz channels are present in the idle state for a specific time period (e.g., PIFS), can transmit a data frame by using an 80 MHz transmission channel. A method of transmitting the data frame will be described hereinafter in greater detail.

The AP needs to select a transmission channel for transmitting and receiving a frame with respect to the associated STA and to announce information thereof to the STA. Information on the transmission channel may include a bandwidth of the transmission channel, information on the P-CH, information on the S-CH, information on the T-CH, and information on the Q-CH. The information on the P-CH may be information indicating a channel number corresponding to the P-CH. The information on the S-CH may be information indicating a channel number corresponding to the S-CH or information indicating a relative location with respect to the P-CH.

In addition, the information on the transmission channel may include a center frequency of a channel band to which the transmission channel is allocated, bandwidth information of the transmission channel, and information indicating a location of the 20 MHz bandwidth P-CH. For example, if the AP is supposed to use a 20 MHz transmission channel, the STA can know a frequency band of the transmission channel when the AP transmits information indicating 20 MHz as bandwidth information of the transmission channel and information indicating the center frequency to the STA. In addition, it can be known that a frequency band allocated to the transmission channel is a frequency band allocated to the P-CH. When it is determined to use a 40 MHz transmission channel, the STA can know the frequency band of the transmission channel when the AT transmits information indicating 40 MHz as the bandwidth information of the transmission channel and information indicating the center frequency to the STA. The same also applies to an 80 MHz (or higher) transmission channel. However, when transmitting information on a transmission channel consisting of a non-contiguous frequency band, information of the transmission channel may include bandwidth information of each divided frequency band and information indicating the center frequency.

The information on the transmission channel may be transmitted as a part of a very high throughput (VHT) operational element. The VHT operational element includes information required for an operation of an AP and/or an STA in the next generation WLAN system. Examples of the information may include information on the transmission channel, information indicating whether to use a reduced interframe spacing (RIFS), and information indicating whether an HT STA supporting 20/40 MHz transmission and a legacy (L)-STA supporting 20 MHz transmission are included in the BSS. The VET operational element can be transmitted to the STA by using an association response frame, a re-association response frame, a probe response frame, a beacon frame, etc., or can be transmitted by using a separate management/action frame for VHT operational element transmission.

Figure 7:
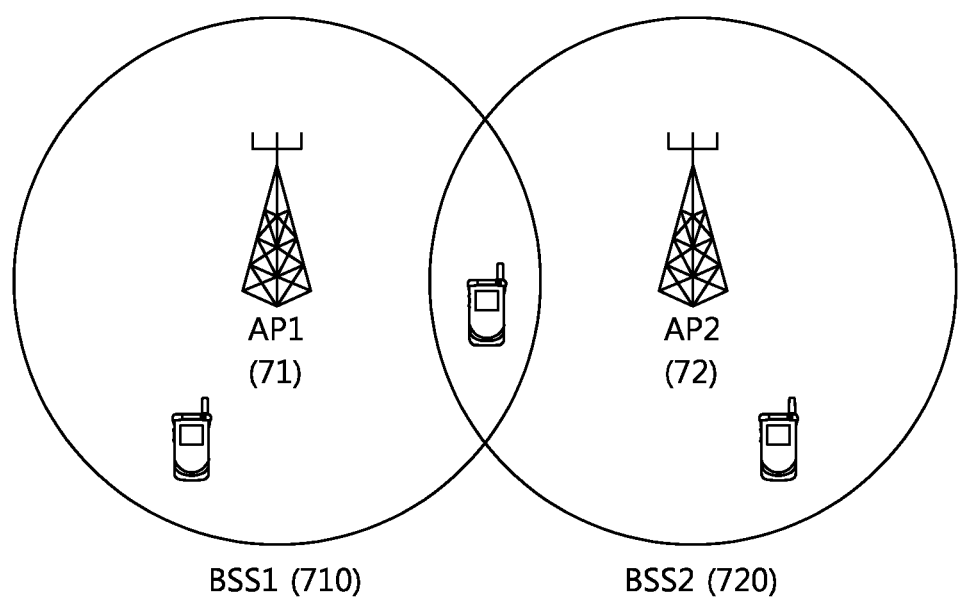
FIG. 7 shows a WLAN environment to which an embodiment of the present invention is applicable.

FIG. 7 shows a WLAN environment to which an embodiment of the present invention is applicable.

Referring to FIG. 7, there is a BSS1 710 configured by an AP1 71, and an AP2 72 intends to configure a new BSS2 720. In this case, the BSS1 710 and the BSS2 720 configure an OBSS environment. If the BSS2 720 is based on a next generation WLAN system supporting an 80 MHz (or higher) transmission channel bandwidth, an OBSS scanning rule supporting the 80 MHz (or higher) transmission channel bandwidth must be taken into consideration when the AP2 72 determines a transmission channel for frame transmission and reception.

When configuring the BSS2 720 which is a new BSS supporting 80 MHz data frame transmission, the AP2 72 must consider an influence to be given to a throughput and fairness of the existing BSS1 710. In this case, the BSS1 710 can support 20 MHz, 20/40 MHz, or 20/40/80 MHz data frame transmission. There is a need for a method capable of selecting/managing a channel by considering an overlap relation of each of a P-CH, an S-CH, a T-CH, and a Q-CH. Hereinafter, a method of selecting a channel according to an OBSS scanning rule at the aforementioned channel band will be described in detail. For convenience of explanation, it is assumed that the AP and/or the STA transmit data through 20, 40, and 80 MHz transmission channels in the next generation WLAN system. However, the embodiment proposed in the present invention is also applicable to a WLAN system supporting an 80 MHz (or higher) transmission channel.

Table 2 below shows an example in which the OBSS scanning rule of the HT WLAN system is extendedly applied to the next generation WLAN system supporting 80 MHz data frame transmission.

TABLE 2

| BSS2 | BSS1 | | | |
|---|---|---|---|---|
| | Primary Channel | Secondary Channel | Tertiary Channel | Quaternary Channel |
| Primary Channel | O | X | X | X |
| Secondary Channel | X | O | O | O |
| Tertiary Channel | X | O | O | O |
| Quaternary Channel | X | O | O | O |

Referring to Table 2, when selecting the T-CH and the Q-CH, the BSS2 cannot select them by allowing overlapping with the P-CH selected by the BSS1. In addition, the S-CH of the BSS2 newly configured can be selected by allowing overlapping with the T-CH and/or the Q-CH of the existing BSS1. Since the P-CH can be freely selected, a freedom of selecting a transmission channel for 80 MHz frame transmission is high and thus 80 MHz frame transmission can be more effectively supported. The transmission channel selection method based on the channel scanning rule proposed in Table 2 will be described below.

Figure 8:
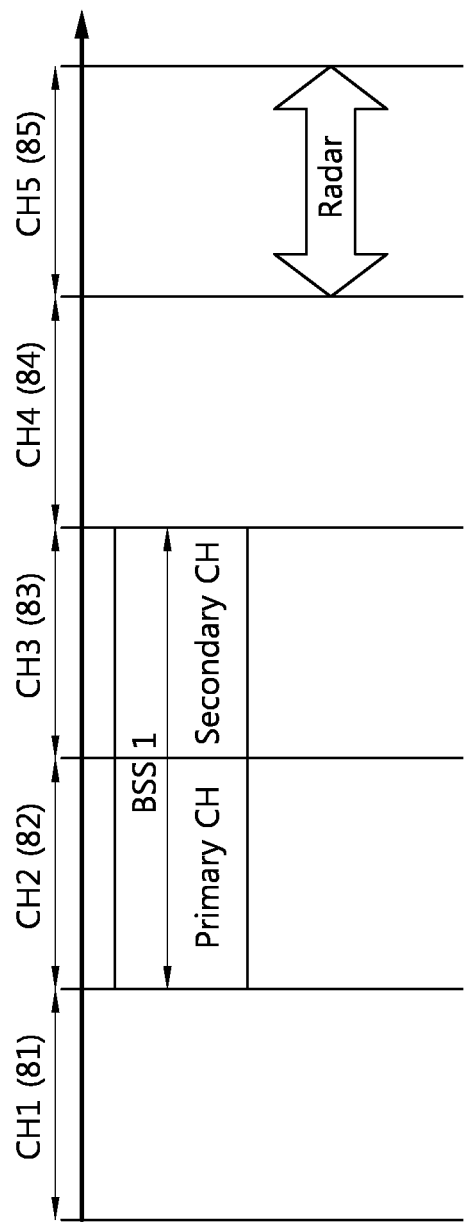
FIG. 8 shows an example of a channel environment to which a channel selection method is applicable according to an embodiment of the present invention.

FIG. 8 shows an example of a channel environment to which a channel selection method is applicable according to an embodiment of the present invention.

Referring to FIG. 8, a full channel band consists of channels, that is, a CH1 81, a CH2 82, a CH3 83, a CH4 84, and a CH5 85, each having a 20 MHz bandwidth. It is assumed that a P-CH of a BSS1 supporting an HT WLAN system is selected as the CH2 82, an S-CH is selected as the CH3 73, and the CH5 85 is in a channel environment in which a radar is detected. In this case, an AP which intends to configure a new BSS2 supporting 80 MHz frame transmission must be able to effectively select/manage a transmission channel. There may be several methods for selecting a transmission channel of the BSS2 by considering the existing BSS1, and this is shown in FIG. 9 to FIG. 11.

Figure 9:
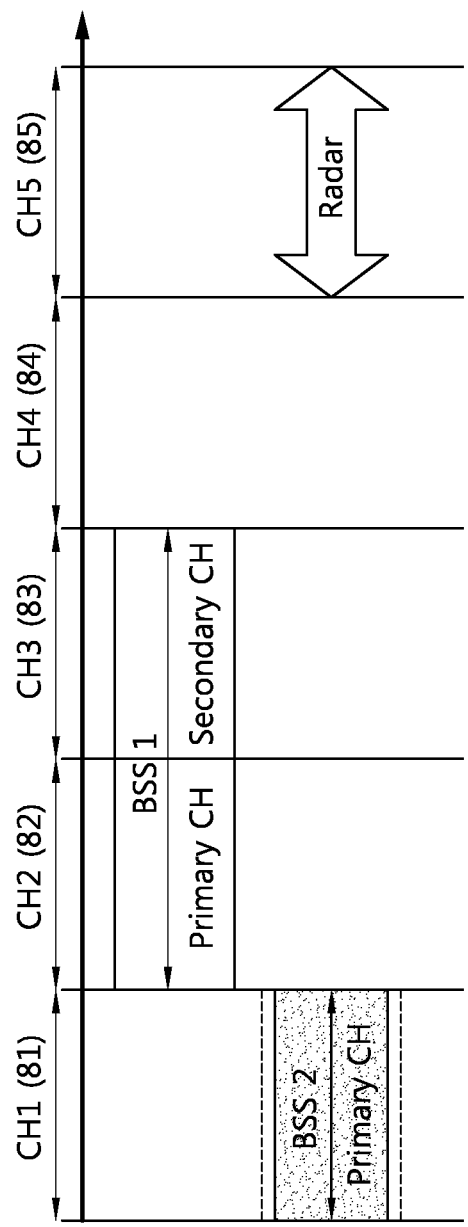
FIG. 9 shows a first example of channel selection based on an OBSS channel scanning rule according to an embodiment of the present invention.

FIG. 9 shows a first example of channel selection based on an OBSS channel scanning rule according to an embodiment of the present invention.

In the example of FIG. 9, a P-CH of a BSS2 is selected as a CH1 81. In this case, according to the OBSS channel scanning rule of Table 2, an S-CH of the BSS2 cannot be allowed to overlap with a CH2 82 which is a P-CH of a BSS1. Therefore, since an AP cannot select the CH2 82 as an S-CH, the BSS2 can support only 20 MHz frame transmission and/or reception in this case.

Figure 10:
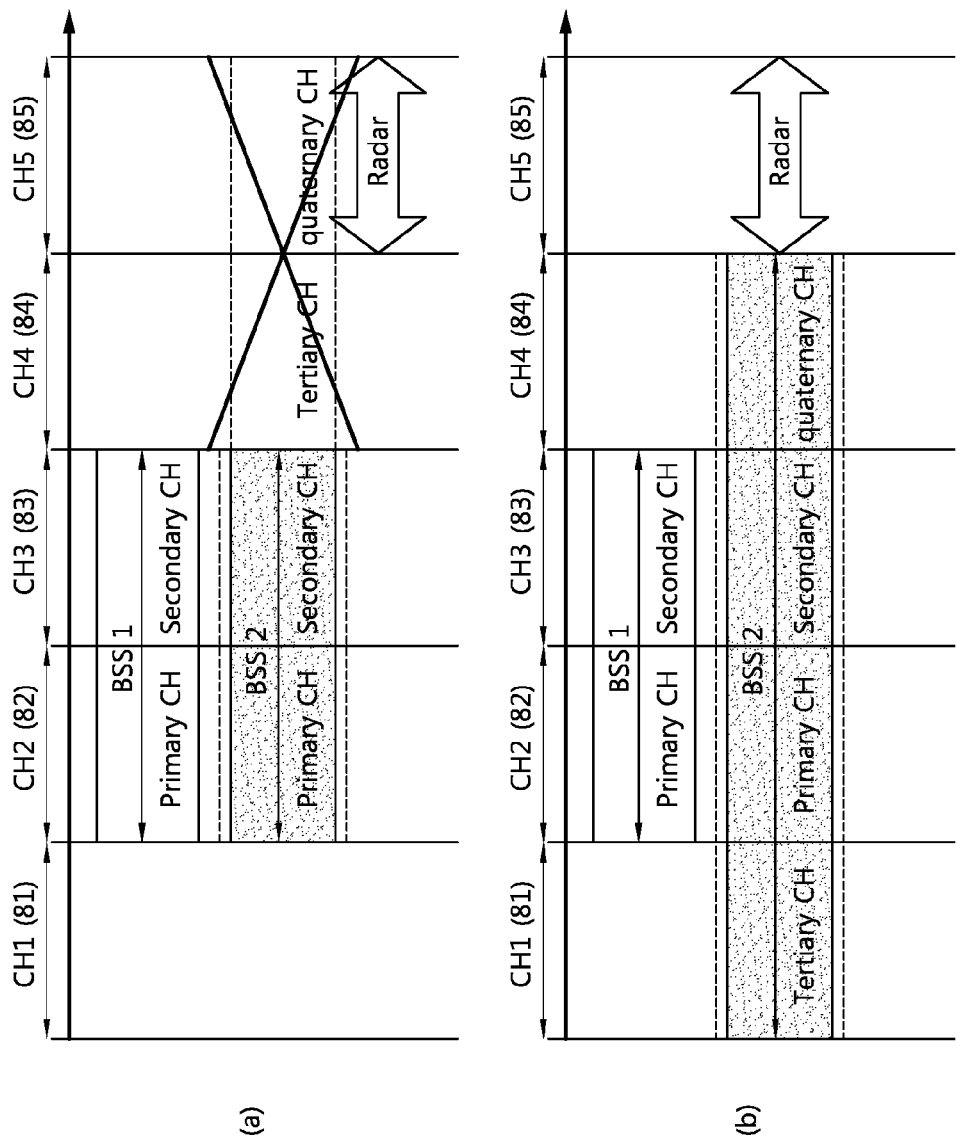
FIG. 10 shows a second example of channel selection based on an OBSS channel scanning rule according to an embodiment of the present invention.
Figure 11:
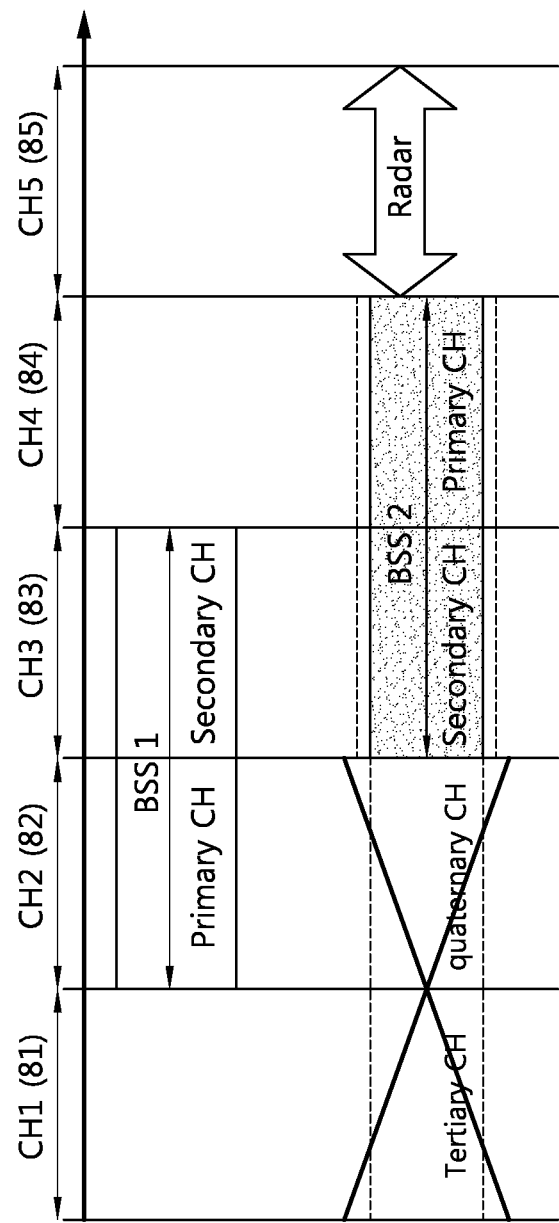
FIG. 11 shows a third example of channel selection based on an OBSS channel scanning rule according to an embodiment of the present invention.

FIG. 10 shows a second example of channel selection based on an OBSS channel scanning rule according to an embodiment of the present invention.

Referring to FIG. 10, a P-CH of a BSS2 is selected as a CH2 82. In this case, according to the OBSS channel scanning rule based on Table 2, an S-CH can be selected as a CH3 83 selected as an S-CH of a BSS1.

A sub-figure (a) of FIG. 10 shows an example of transmission channel selection in case of selecting a transmission channel used in a typical BSS when there is a restriction in that a P-CH can be located in a boundary channel of a full channel band. An AP cannot select a CH1 81 as a T-CH and/or a Q-CH. This is because a CH2 82 selected as a P-CH must be located in a boundary of a full transmission channel. In addition, a CH5 85 cannot be selected as a channel because the CH5 85 corresponds to a channel in which a radar is detected, and therefore the BSS2 cannot support 80 MHz frame transmission and can support up to 40 MHz frame transmission.

A sub-figure (b) of FIG. 10 shows an example of transmission channel selection when there is a restriction in that a P-CH can be located to a middle channel in a full channel band. Unlike the sub-figure (a), a CH1 81 and a CH4 84 can be selected as a T-CH and/or a Q-CH. Therefore, a BSS2 can support up to 80 MHz frame transmission. However, in this case, if there is a need for a condition in which 4 MHz configured by the T-CH and the Q-CH corresponds to a contiguous frequency band, only up to 40 MHz frame transmission may be supported as shown in the example of sub-figure (a).

Meanwhile, an AP that configures the BSS2 cannot select the CH3 83 as the P-CH. The reason of this is that a channel to be selected as the P-CH of the BSS2 and a channel selected as the S-CH of the BSS1 cannot overlap according to the OBSS channel scanning rule of Table 2. This is because a fairness problem may be caused in a channel access of the BSS1 and the BSS2.

FIG. 11 shows a third example of channel selection based on an OBSS channel scanning rule according to an embodiment of the present invention.

In the example of FIG. 11, a P-CH of a BSS2 is selected as a CH4 84. According to the OBSS channel scanning rule based of Table 2, an S-CH can be selected as a CH3 83. However, since a T-CH and/or a Q-CH of the BSS2 cannot overlap with the P-CH of the BSS1, the BSS2 can support only up to 40 MHz frame transmission. Maximum transmission channel selection is possible when an AP selects a transmission channel according to another OBSS scanning rule in which the T-CH and/or the Q-CH of the BSS2 can overlap with the P-CH of the BSS1. This will be described below.

In a channel selection method of a next generation WLAN system supporting 80 MHz frame transmission, a method capable of effectively supporting an 80 MHz channel bandwidth is important when considering a fairness similarly to an HT WLAN system. Hereinafter, a method of selecting an 80 MHz channel on the basis of Table 2 in which the OBSS channel scanning rule of the conventional HT WLAN system is extended will be proposed. Since the next generation WLAN system supports only a frequency band less than 6 GHz, a 5 GHz band of the HT WLAN system will be described for example. Hereinafter, a method of selecting an 80 MHz channel of a BSS to be newly configured will be described when an OBSS environment supporting the 80 MHz channel is configured by an existing BSS using a 40 MHz channel and the BSS to be newly configured.

<Case. 1 Non-overlapping 80 MHz Channel Selection>

Figure 12:
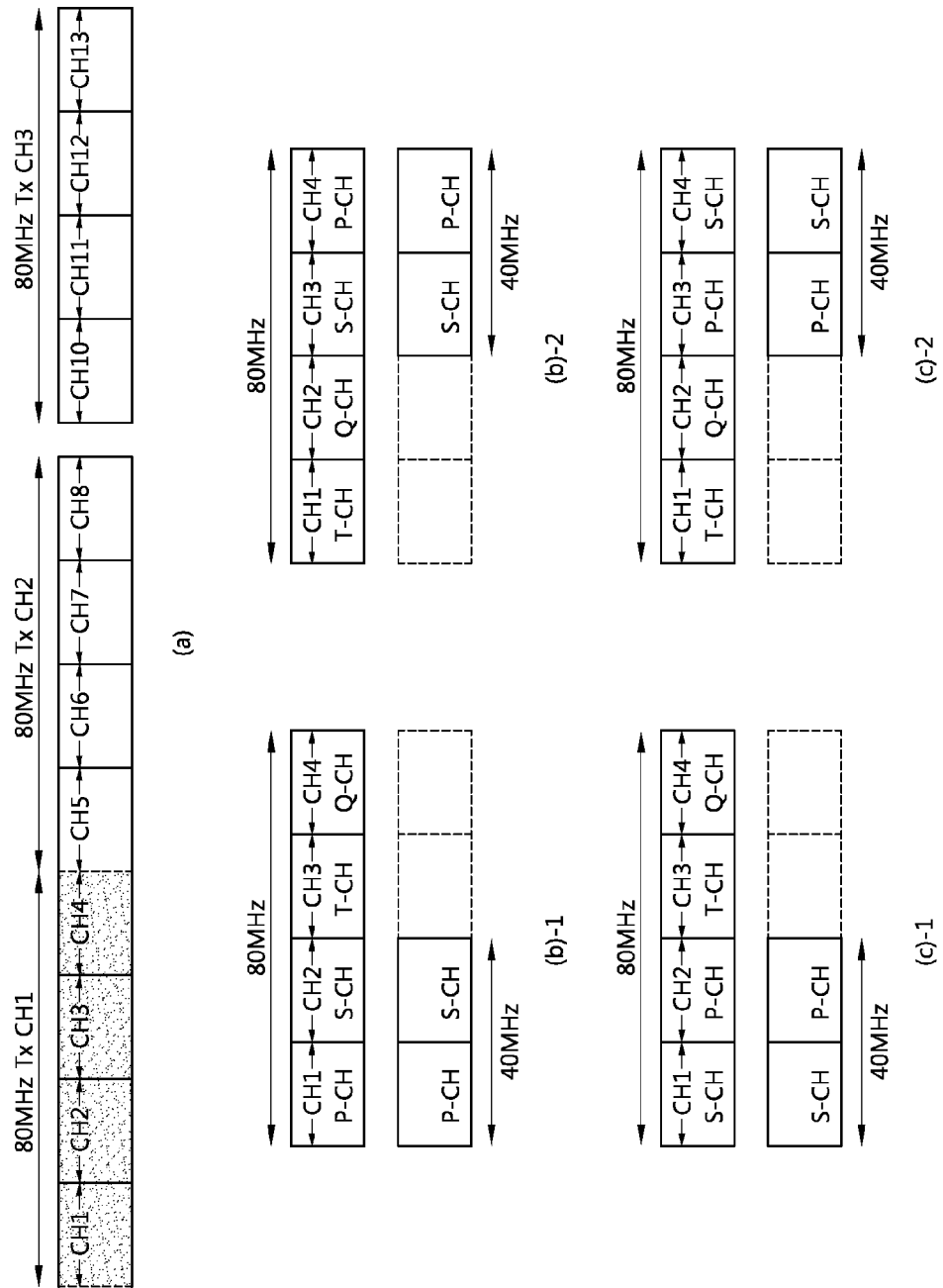
FIG. 12 shows a first example of an 80 MHz channel selection method according to an embodiment of the present invention.

FIG. 12 shows a first example of an 80 MHz channel selection method according to an embodiment of the present invention.

Referring to a sub-figure (a) of FIG. 12, 8 channels (i.e., a CH1 to a CH8) each having a 20 MHz bandwidth are located contiguously. An 80 MHz transmission channel band including the CH1, the CH2, the CH3, and the CH4 can be a UNIT lower frequency band, and an 80 MHz channel band including the CH5, the CH6, the CH7, and the CH8 can be a UNIT middle frequency band. In addition, four channels (i.e., a CH9 to a CH12) each having a 20 MHz bandwidth are located contiguously. An 80 MHz channel band including the CH9, the CH10, the CH11, and the CH12 can be a UNIT upper frequency band. It is assumed that the UNIT lower/middle frequency band and the UNIT upper frequency band are non-contiguous.

When an 80 MHz channel is selected in a non-overlapping manner, three 80 MHz channels can be selected. Among them, it is assumed that an 80 MHz channel consisting of four 20 MHz channels, i.e., the CH1 to the CH4, is an 80 MHz transmission (Tx) CH1, an 80 MHz channel consisting of four 20 MHz channels, i.e., the CH5 to the CH8, is an 80 MHz Tx CH2, and an 80 MHz channel consisting of four 20 MHz channels, i.e., the CH9 to the CH12, is an 80 MHz Tx CH3.

In the 80 MHz CH1, a primary channel (P-CH) can be selected as the CH1 or CH4 which is a 20 MHz boundary sub-channel of the 80 MHz channel as shown in the sub-figures (b)-1 and 2. This is an example in which the OBSS channel scanning rule of the HT WLAN system is simply extended.

Meanwhile, the P-CH can be selected as the CH2 or CH4 which is a middle 20 MHz channel of the 80 MHz channel as shown in the sub-figures (c)-1 and 2. In this case, if there is a condition in which a tertiary channel (T-CH) and a quaternary channel (Q-CH) are located contiguously, the 80 MHz channel can be used only when the CH2 of the sub-figure (c)-1 and the CH3 of the sub-figure (c)-2 are selected as a secondary channel (S-CH). If the aforementioned condition does not exist, even if the CH3 of the sub-figure (c)-1 and the CH2 of the sub-figure (c)-2 are selected as an S-CH, frame transmission through the 80 MHz transmission channel can be supported since a T-CH and a Q-CH can be selected.

If the P-CH can be located in any position of a channel constituting an 80 MHz transmission channel band, frame transmission through the 80 MHz channel can be effectively supported.

<Case. 2 Overlapping 80 MHz channel Selection with the Shifted 40 MHz>

Figure 13:
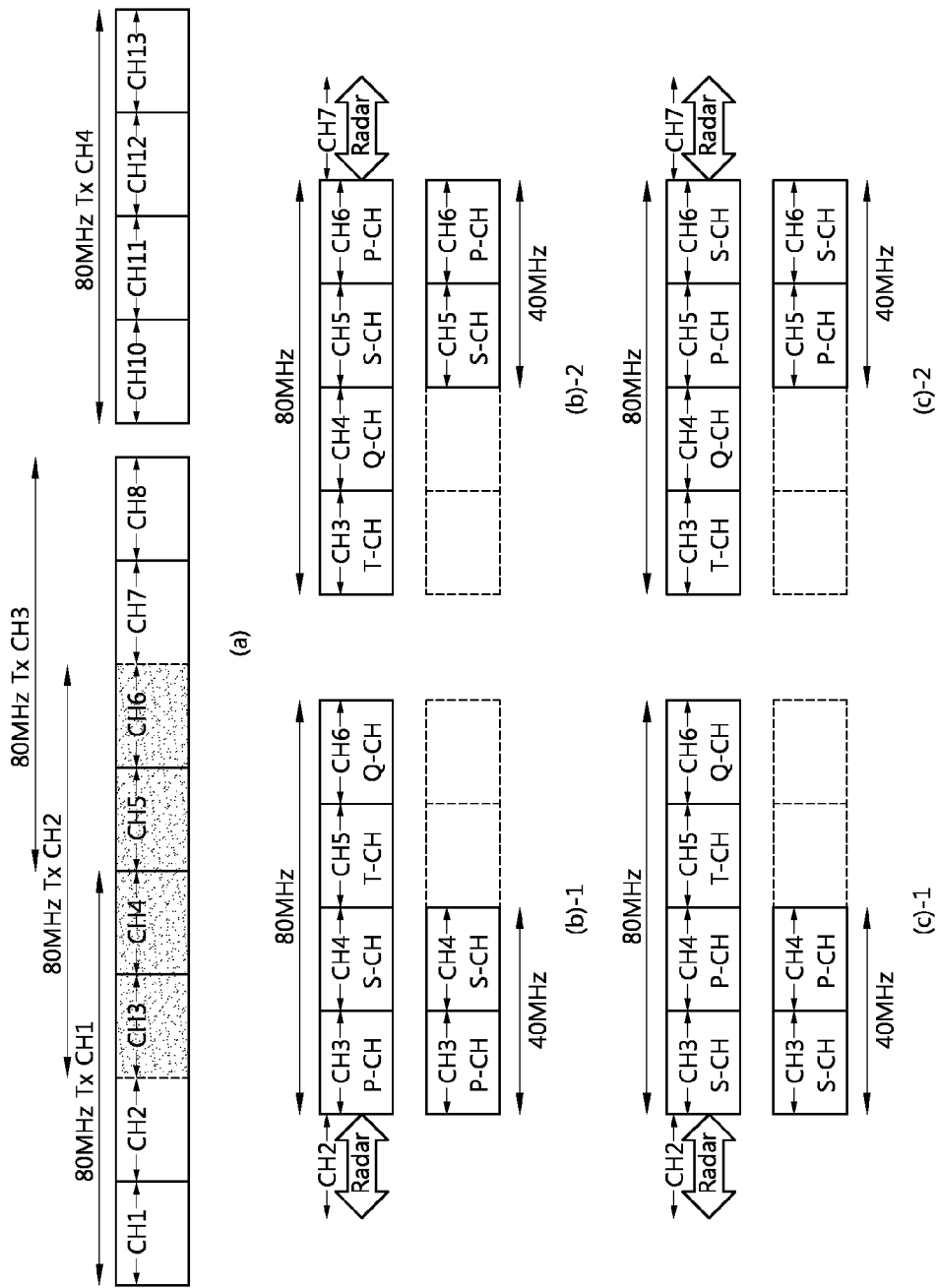
FIG. 13 shows a second example of an 80 MHz channel selection method according to an embodiment of the present invention.

FIG. 13 shows a second example of an 80 MHz channel selection method according to an embodiment of the present invention.

Referring to a sub-figure (a) of FIG. 13, there are an 80 MHz Tx CH 1 including a CH1 to a CH4, an 80 MHz Tx CH2 including a CH3 to a CH6, an 80 MHz Tx CH3 including a CH5 to a CH8, and an 80 MHz Tx CH4 including a CH9 to a CH12. That is, the 80 MHz Tx CH2 is a channel shifted by 40 MHz from the 80 MHz Tx CH1, and the 80 MHz Tx CH3 is a channel shifted by 40 MHz from the 80 MHz Tx CH2. According to such a channel selection method, four 80 MHz channels can be selected in total in a given frequency band. Since the 80 MHz Tx CH1, the 80 MHz Tx CH3, and the 80 MHz Tx CH4 are identical to the 80 MHz Tx CH1, the 80 MHz Tx CH2, and the 80 MHz Tx CH3 of FIG. 10, descriptions thereof will be omitted.

The 80 MHz Tx CH2 can be selected when a radar is detected in the CH2 and/or the CH7. In the 80 MHz Tx CH2, the P-CH can be determined as the CH3 or CH6 which is a 20 MHz boundary channel of the 80 MHz transmission channel as shown in the sub-figures (b)-1 and 2.

Meanwhile, the P-CH can be selected as the CH4 or CH5 which is a middle 20 MHz channel of the 80 MHz transmission channel as shown in the sub-figures (c)-1 and 2. In this case, if there is a condition in which a T-CH and a Q-CH must be located contiguously, the 80 MHz transmission channel can be used only when the CH3 of the sub-figure (c)-1 and the CH6 of the sub-figure (c)-2 are selected as an S-CH. If the aforementioned condition does not exist, even if the CH5 of the sub-figure (c)-1 and the CH4 of the sub-figure (c)-2 are selected as an S-CH, frame transmission through the 80 MHz transmission channel can be supported since a T-CH and a Q-CH can be selected.

If the P-CH can be located in any position of a channel constituting an 80 MHz transmission channel band, frame transmission through the 80 MHz can be effectively supported.

<Case. 3 Overlapping 80 MHz channel Selection with the Shifted 20 MHz>

Figure 14:
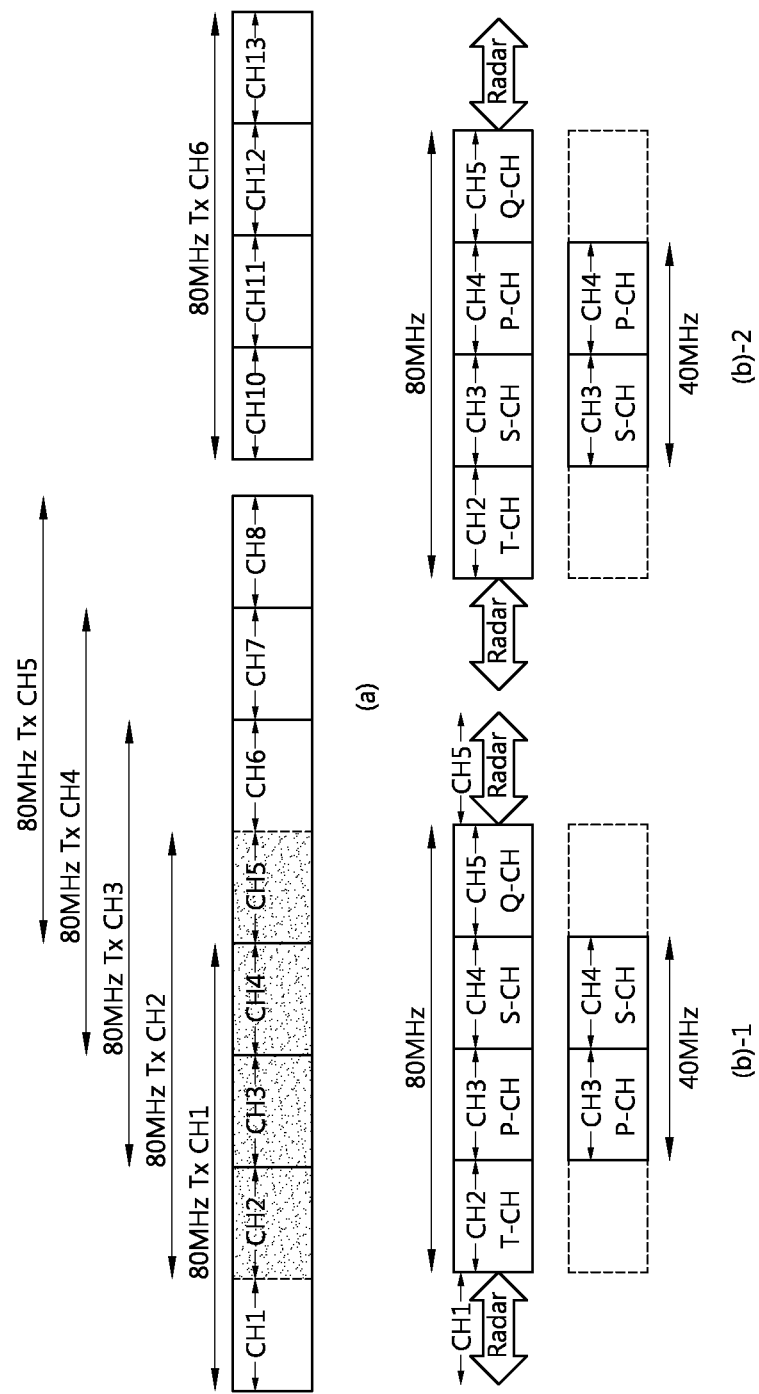
FIG. 14 shows a third example of an 80 MHz channel selection method according to an embodiment of the present invention.

FIG. 14 shows a third example of an 80 MHz channel selection method according to an embodiment of the present invention.

Referring to the sub-figure (a) of FIG. 14, an 80 MHz transmission channel can be selected while shifting by 20 MHz from an 80 MHz Tx CH1 including a CH1 to a CH4. Therefore, an 80 MHz Tx CH1 to an 80 MHz Tx CH6 can be selected, and more 80 MHz channels can be selected than Case 1 and Case 2. Detailed descriptions on the 80 MHz Tx CH1, the 80 MHz Tx CH3, the 80 MHz Tx CH5, and the 80 MHz Tx CH6 will be omitted since a channel can be selected according to a channel selection method proposed in Case 1 and Case 2. Hereinafter, a channel selection method for the 80 MHz Tx CH2 will be described in detail with reference to the sub-figure (b). Since the 80 MHz Tx CH4 is similarly to the channel selection method of the 80 MHz CH2, descriptions thereof will be omitted.

Referring to the sub-figure (b), the 80 MHz Tx CH2 includes four channels (i.e., CH2 to CH5) each having a 20 MHz bandwidth. The 80 MHz Tx CH2 can be selected when a radar is detected in the CH1 and/or the CH6. When a P-CH constituting 40 MHz of a co-existing HT WLAN system is selected, the 80 MHz CH2 can select a P-CH and an S-CH in association therewith. In this case, if there is no condition in which a T-CH and a Q-CH must be contiguous to each other, the 80 MHz transmission channel can be selected by selecting the T-CH as the CH2 and by selecting the Q-CH as the CH5 as shown in the figure.

When considering a deployment of an AP supporting 80 MHz frame transmission, it may be more effective when there are a great number of 80 MHz channels that can be selected. For example, a video streaming service provided by being implemented in a home entertainment system in a home can be a typical usage model. Since a video stream requires a high throughput, it is expected to require an AP and/or an STA supporting an 80 MHz capability. In addition, when considering an environment (e.g., an apartment building) in which residents are concentrated, many targets are required for the 80 MHz transmission channel that can be selected. This is because, if there is a small number of targets of the 80 MHz transmission channel that can be selected, up to 40 MHz capability can be supported in practice even if the AP has an 80 MHz capability of a high cost.

The aforementioned transmission channel selection method is based on Table 2 showing a rule obtained by extendedly applying an OBSS channel scanning rule used as a basis of selecting a P-CH and an S-CH which constitute a 40 MHz transmission channel in the HT WLAN system to 80 MHz transmission channel selection. On the other hand, the transmission channel selection method for 80 MHz frame transmission can be based on another OBSS channel scanning rule, and will be described below by taking Table 3 and Table 4 for example.

TABLE 3

| BSS2 | BSS1 | | | |
|---|---|---|---|---|
| | Primary Channel | Secondary Channel | Tertiary Channel | Quaternary Channel |
| Primary Channel | ○ | X | X | X |
| Secondary Channel | X | ○ | X | X |
| Tertiary Channel | X | X | ○ | X |
| Quaternary Channel | X | X | X | ○ |

Referring to Table 3, when selecting the T-CH and the Q-CH, the BSS2 cannot select them by allowing overlapping with the P-CH selected by the BSS1. However, unlike in the case based on the OBSS channel scanning rule proposed in Table 2, the S-CH of the BSS2 newly configured cannot be selected by allowing overlapping with the T-CH and/or the Q-CH of the existing BSS1 in Table 3. The OBSS channel scanning rule of Table 2 can select an S-CH more freely than that of Table 3. That is, since a freedom of selecting a transmission channel for 80 MHz frame transmission is high, 80 MHz frame transmission can be more effectively supported. On the other hand, since the OBSS channel scanning rule of Table 3 does not allow overlapping selection of a T-CH and/or a Q-CH which are selected by the existing BSS1 and an S-CH to be selected by the BSS2, a channel selection freedom for 80 MHz frame transmission is relatively low, but a fairness of channel selection of the BSS1 and the BSS2 can be ensured to be relatively high.

Table 4 below shows a method in which channel selection only for a P-CH and an S-CH is based on OBSS channel scanning rule of an HT WLAN system.

TABLE 4

| BSS2 | BSS1 | | | |
|---|---|---|---|---|
| | Primary Channel | Secondary Channel | Tertiary Channel | Quaternary Channel |
| Primary Channel | ○ | X | ○ | ○ |
| Secondary Channel | X | ○ | ○ | ○ |
| Tertiary Channel | ○ | ○ | ○ | ○ |
| Quaternary Channel | ○ | ○ | ○ | ○ |

Referring to Table 4, a P-CH of a BSS2 to be newly configured can be selected irrespective of whether it is selected in an overlapping manner with a T-CH and/or a Q-CH of an existing BSS1. Likewise, an S-CH can also be selected irrespective of whether it is selected in an overlapping manner with the T-CH and/or the Q-CH of the BSS1. A difference with the OBSS scanning rule proposed in Table 2 and Table 3 lies in that the T-CH and/or the Q-CH of the BSS2 which is newly configured can be selected irrespective of whether it is selected in an overlapping manner with the P-CH and/or the S-CH of the existing BSS1. This can be usefully applied in a channel environment of FIG. 15.

Figure 15:
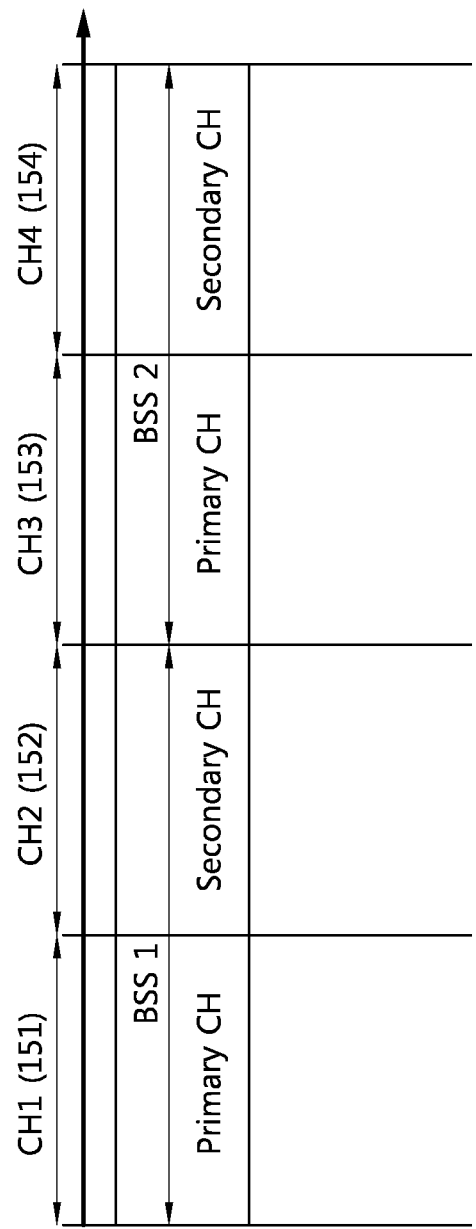
FIG. 15 shows a channel environment to which an embodiment of the present invention is applicable.

FIG. 15 shows a channel environment to which an embodiment of the present invention is applicable.

Referring to FIG. 15, four channels 151, 152, 153, and 154 each having a 20 MHz bandwidth are located contiguously in an 80 MHz frequency band. In addition, a BSS1 and a BSS2 which are based on an HT WLAN system are configured, and the BSS1 supports 20/40 MHz transmission by selecting a CH1 141 and a CH2 142 as a transmission channel. The BSS1 selects the CH1 151 as a P-CH, and selects the CH2 152 as an S-CH. The BSS2 supports 20/40 MHz transmission by selecting the CH3 143 and the CH4 144 as a transmission channel. The BSS2 selects the CH3 143 as a P-CH and the CH4 144 as an S-CH.

In the channel environment of FIG. 15, an AP which intends to configure a new BSS3 supporting 20/40/80 MHz transmission can support up to 40 MHz transmission when selecting a channel by using the OBSS channel scanning rule of Table 2 and Table 3 above. This will be described in greater detail with reference to FIG. 16.

Figure 16:
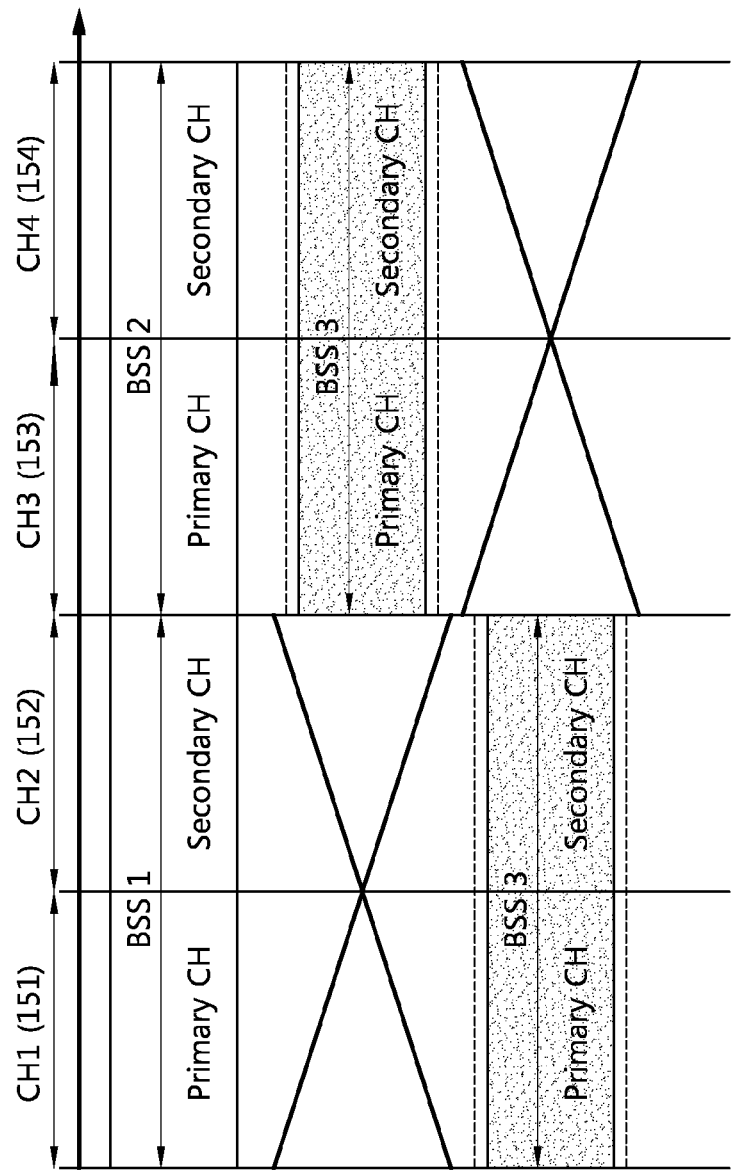
FIG. 16 shows an example of transmission channel selection according to an embodiment of the present invention.

FIG. 16 shows an example of transmission channel selection according to an embodiment of the present invention.

Referring to FIG. 16, an AP which intends to configure a BSS3 cannot select a CH1 151 and a CH2 152 as a T-CH and a Q-CH when a CH3 153 is selected as a P-CH and a CH4 154 is selected as an S-CH. This is because a T-CH and/or Q-CH of the BSS3 can be selected in an overlapping manner with a P-CH and/or S-CH of a BSS1. On the contrary, when the AP selects the CH1 151 as the P-CH and selects the CH2 152 as the S-CH, the CH3 153 and the CH4 154 cannot be selected as the T-CH and the Q-CH. This is because the T-CH and/or Q-CH of the BSS3 can be selected in an overlapping manner with the P-CH and/or S-CH of the BSS2.

On the contrary, when a channel is selected using an OBSS channel scanning rule of Table 4, a newly configured BSS3 can support 80 MHz frame transmission. This will be described below with reference to FIG. 17.

Figure 17:
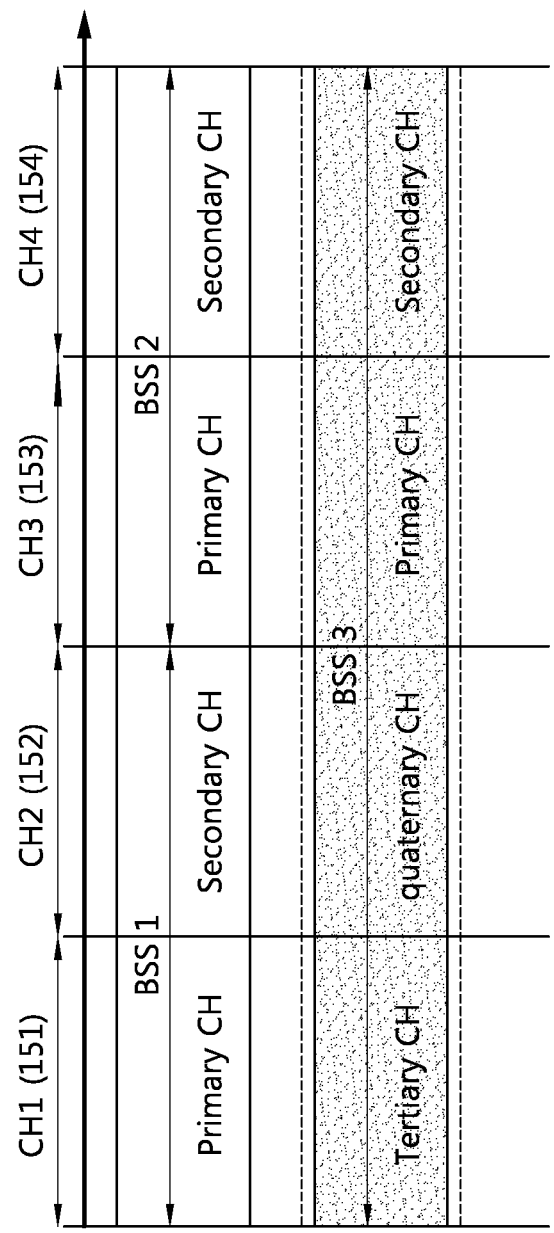
FIG. 17 shows another example of channel selection according to an embodiment of the present invention.

FIG. 17 shows another example of channel selection according to an embodiment of the present invention.

Referring to FIG. 17, an AP which intends to configure a BSS3 can select a CH1 151 and/or a CH2 162 as a T-CH and/or a Q-CH even if a CH3 153 is selected as a P-CH and a CH4 154 is selected as an S-CH. This is because a P-CH and/or S-CH of a BSS2 and a T-CH and/or Q-CH of the BSS3 to be newly configured are allowed to overlap with each other. Therefore, STAs and the AP constituting the BSS3 can transmit and/or receive an up to 80 MHz frame.

In addition, when a transmission channel is selected based on the OBSS channel scanning rule of Table 4 in the channel environment of FIG. 10, an 80 MHz transmission channel can be selected for the AP. This is because a P-CH and/or S-CH of a BSS2 and a T-CH and/or Q-CH of the BSS3 to be newly configured are allowed to overlap with each other.

As such, when a new OBSS channel scanning rule is supplied, even in a situation where a plurality of BSSs supporting 40 MHz frame transmission constitute an OBSS environment, an AP having an 80 MHz capability can operate with its maximum performance.

Meanwhile, when repetitive data is transmitted through a different frequency block, transmission is performed by multiplying any complex value to decrease a PAPR. In the HT WLAN system, a length-2 sequence $\{+1, -j\}$ is applied to decrease the PAPR when transmitting a 40 MHz data frame through two 20 MHz channels. On the other hand, in case of the next generation WLAN system, an 80 MHz data frame is transmitted through four 20 MHz channels. In such a situation, a length-4 sequence for decreasing the PAPR can be expressed by $\{a, b, c, d\}$ or $\{ae^{-j2\pi\theta}, be^{-j2\pi\theta}, c, d\}$. Herein, a, b, c, and d are any complex values, and $0 \leq \theta \leq 2$. For example, when selecting an 80 MHz transmission channel, it can be assumed that 'a' to be multiplied by a lower 20 MHz and 'b' to be multiplied by an upper 20 MHz are +1 and +j, and $\theta=0$. As a result, a sequence of $\{+1, +j, c, d\}$ can be used for 80 MHz data frame transmission.

As described above with reference to FIG. 8 to FIG. 11, in an 80 MHz transmission channel bandwidth, locations of the P-CH and S-CH can change within an 80 MHz bandwidth. Therefore, it is proposed to decrease the PAPR by applying a different sequence according to the location of the P-CH/S-CH. This will be described hereinafter with reference to FIG. 18 to FIG. 20.

Figure 18:
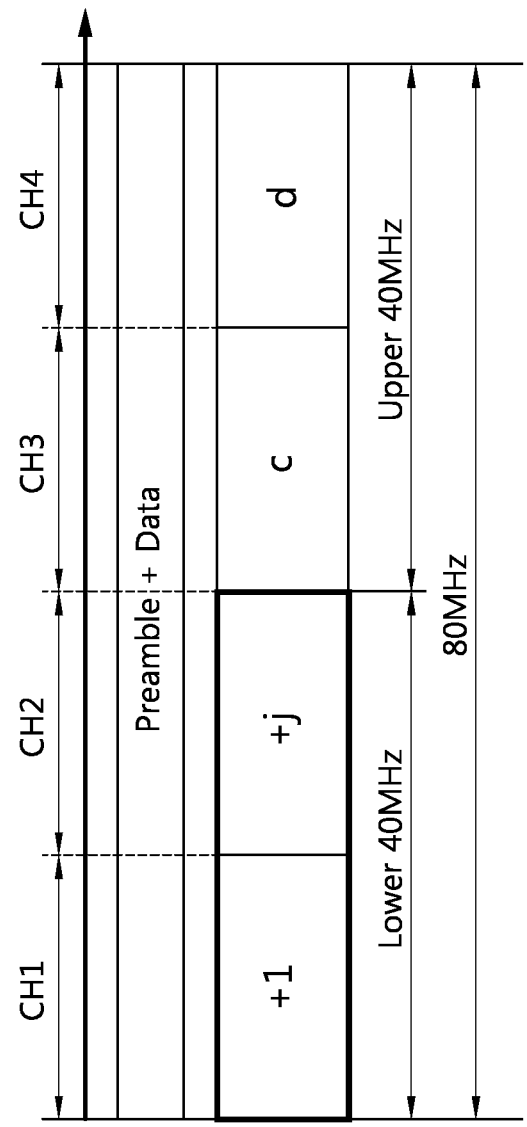
FIG. 18 shows a first example of applying a sequence to decrease a PAPR according to an embodiment of the present invention.

FIG. 18 shows a first example of applying a sequence to decrease a PAPR according to an embodiment of the present invention.

Referring to FIG. 18, a P-CH and an S-CH are located at a lower 40 MHz band in a full 80 MHz bandwidth. Locations of the P-CH and the S-CH may change to each other within a 40 MHz bandwidth. In such a channel environment, if it is assumed that a length-4 sequence in use is a=1, b=−j, and θ=0, transmission is performed by multiplying a sequence of {+1, +j, c, d} by a 20 MHz channel. In doing so, the PAPR can be decreased in 40 MHz data frame transmission that can be performed in the HT WLAN system in which transmission is performed through the lower 40 MHz, and backward compatibility can be satisfied. In this case, c and d may be +1, and −j.

Figure 19:
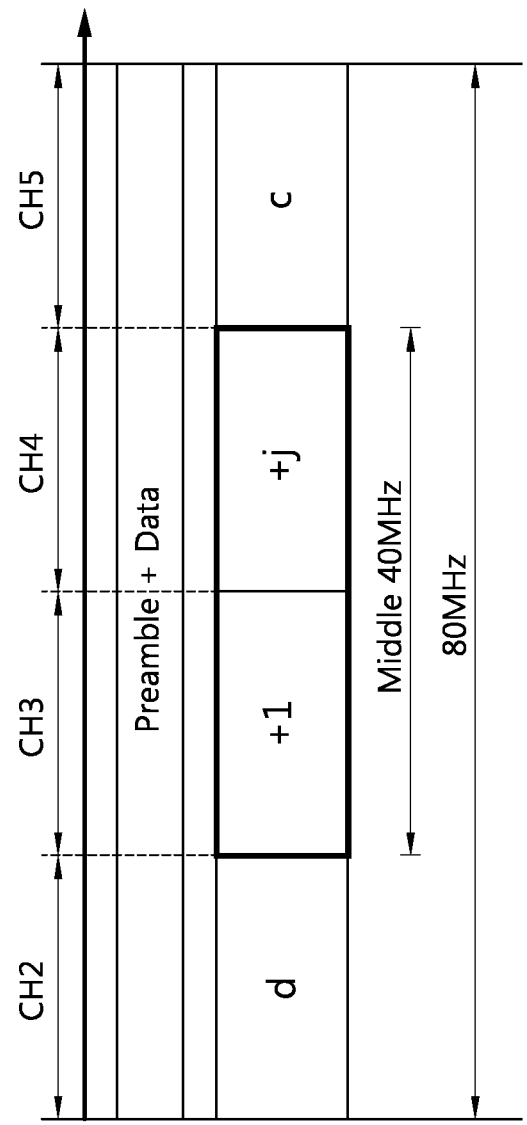
FIG. 19 shows a second example of applying a sequence to decrease a PAPR according to an embodiment of the present invention.

FIG. 19 shows a second example of applying a sequence to decrease a PAPR according to an embodiment of the present invention.

Referring to FIG. 19, a P-CH and an S-CH are located in a middle 40 MHz band in a full 80 MHz bandwidth.

Locations of the P-CH and the S-CH may change to each other within a 40 MHz bandwidth. In such a channel environment, if it is assumed that a length-4 sequence in use is a=1, b=−j, and θ=0, transmission is performed by multiplying a sequence of {d, +1, +j, c} by a 20 MHz channel. In doing so, the PAPR can be decreased in 40 MHz data frame transmission that can be performed in the HT WLAN system in which transmission is performed through the middle 40 MHz, and backward compatibility can be satisfied. In this case, c and d may be +1, and −j.

Figure 20:
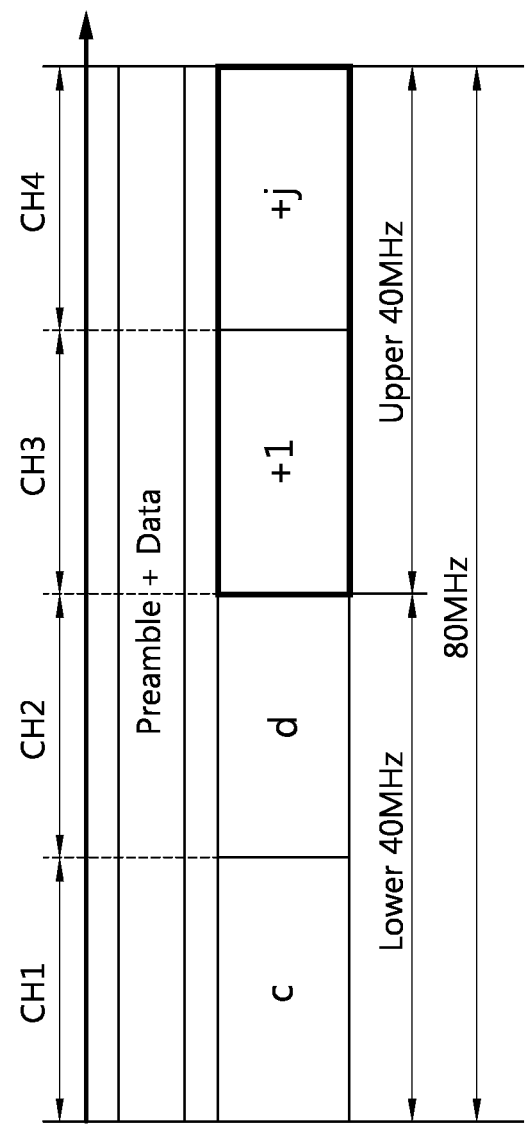
FIG. 20 shows a third example of applying a sequence to decrease a PAPR according to an embodiment of the present invention.

FIG. 20 shows a third example of applying a sequence to decrease a PAPR according to an embodiment of the present invention.

Referring to FIG. 20, a P-CH and an S-CH are located in an upper 40 MHz band in a full 80 MHz bandwidth. Locations of the P-CH and the S-CH may change to each other within a 40 MHz bandwidth. In such a channel environment, if it is assumed that a length-4 sequence in use is a=1, b=−j, and θ=0, transmission is performed by multiplying a sequence of {c, d, +1, +j} by a 20 MHz channel. In doing so, the PAPR can be decreased in 40 MHz data frame transmission that can be performed in the HT WLAN system in which transmission is performed through the middle 40 MHz, and backward compatibility can be satisfied. In this case, c and d may be +1, and −j.

In the aforementioned embodiment, a sequence is differently applied according to 80 MHz transmission channel selection. The aforementioned sequence can be configured such that it is cyclically shifted according to a location of a P-CH.

In addition, $\{ae^{-j2\pi\theta}, be^{-j2\pi\theta}, c, d\}$ may be any one of $\{1 \cdot e^{-j2\pi\theta}, j \cdot e^{-j2\pi\theta}, +1, -j\}$, $\{1 \cdot e^{-j2\pi\theta}, 1 \cdot e^{-j2\pi\theta}, -1, +1\}$, and $\{1 \cdot e^{-j2\pi\theta}, -1 \cdot e^{-j2\pi\theta}, +1, -1\}$. For example, if it is assumed that θ=0, data can be multiplied by {+1, +j, +1, −j} and then can be transmitted through the 20 MHz channel, or data can be multiplied by {+1, +1, −1, +1} or {+1, −1, +1, +1} and then can be transmitted through the 20 MHz channel. This corresponds to a sequence capable of decreasing the PAPR to the maximum extent possible.

Meanwhile, when the AP transmits and/or receives a frame with respect to the STA, it may be necessary to change a transmission channel. This will be described below with reference to FIG. 21.

Figure 21:
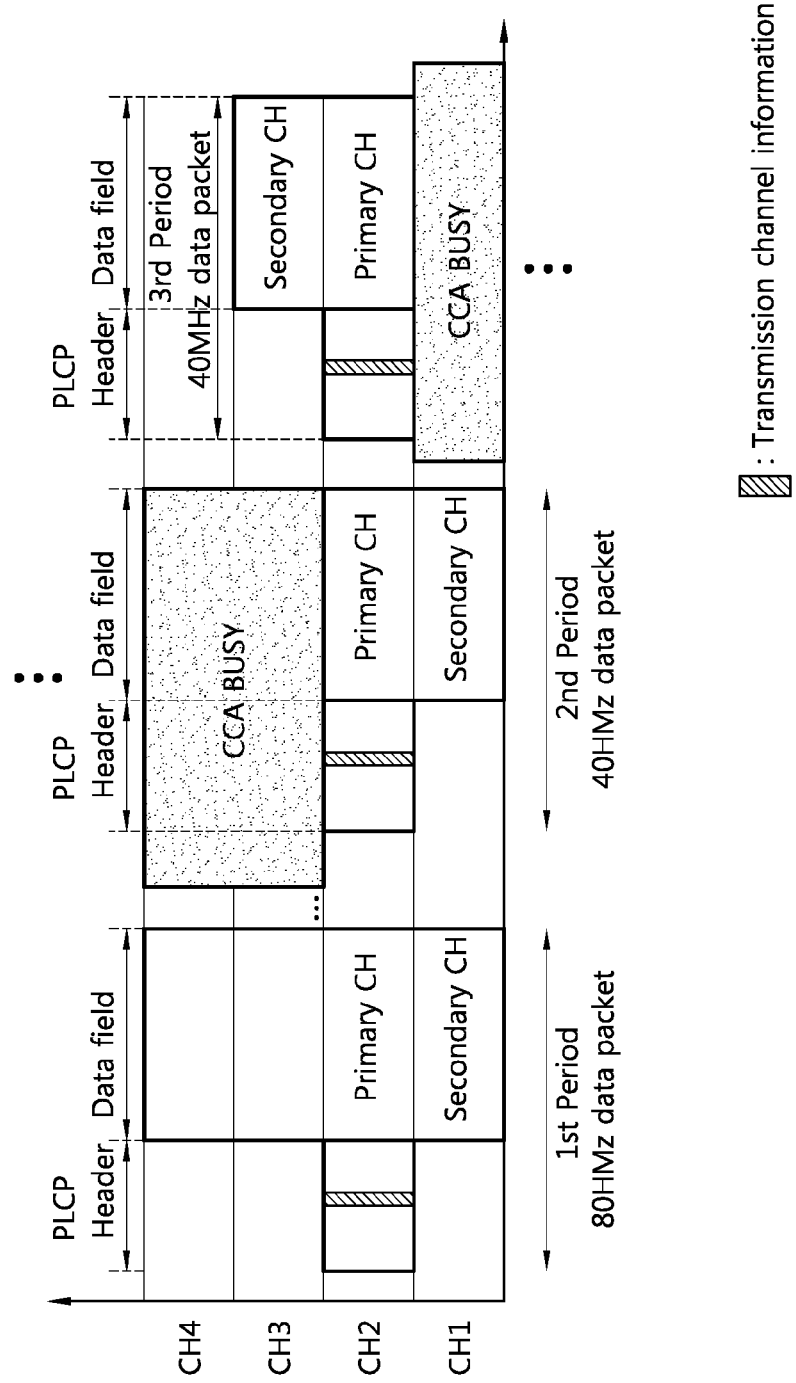
FIG. 21 shows a data frame transmission method according to an embodiment of the present invention.

FIG. 21 shows a data frame transmission method according to an embodiment of the present invention.

Referring to FIG. 21, in a 1$^{st}$ period, a CH1 to a CH4 are in an idle state. Therefore, an AP and/or an STA can transmit a data frame through an 80 MHz transmission channel during the 1$^{st}$ period, and when selecting a transmission channel, the AP and/or the STA select the CH2 as a P-CH, the CH1 as an S-CH, and the CH3 and the CH4 as a T-CH and a Q-CH. Optionally, the T-CH and the Q-CH can be collectively referred to as a 40 MHz secondary channel (S-CH). The AP and/or the STA can transmit a data frame through the 80 MHz transmission channel including the CH1 to the CH4 to a reception STA and/or AP.

Before transmitting the data frame, the AP and/or the STA need to confirm whether a channel is in the idle state. This can be performed based on a clear channel assessment (CCA) defined in the IEEE 802.11 standard. The AP and/or the STA can perform channel sensing, and can confirm a channel state according to a CCA result. The channel sensing performed by the AP and/or the STA can be performed in the order of P-CH→S-CH→T-CH→Q-CH. If the T-CH and the Q-CH are collectively treated as a 40 MHz S-CH, the channel sensing can be performed in the order of P-CH→S-CH→40 MHz S-CH. In this case, a 40 MHz channel set consisting of the existing P-CH and S-CH may be a 40 MHz P-CH. In addition, if a transmission channel bandwidth supporting the AP and/or the STA is greater than or equal to 80 MHz, for example, 160 MHz, the channel sensing can be performed in the order of P-CH→S-CH→40 MHz S-CH→80 MHz S-CH. Herein, the 80 MHz S-CH implies a channel set of an 80 MHz bandwidth contiguous to a channel set of the existing 80 MHz bandwidth or a channel set of an 80 MHz bandwidth non-contiguous thereto. In this case, the channel set of the existing 80 MHz bandwidth can be referred to as an 80 MHz P-CH.

More particularly, the AP and/or the STA can transmit a mask frame having a size of 20 MHz on a 20 MHz P-CH according to a hybrid coordination function (HCF) contention-based channel access (EDCA) rule. When the AP and/or the STA transmit a mask frame having a size of 40 MHz by obtaining a transmission opportunity by waiting for point (coordination function) interframe space (PIFS) or according to the EDCA, the AP and/or the STA must perform channel sensing through a CCA for both of the P-CH having a size of 20 MHz and an S-CH having a size of 20 MHz. When the AP and/or the STA transmit a mask frame having a size of 80 MHz by obtaining a transmission opportunity by waiting for PIFS or according to the EDCA, the AP and/or the STA must perform channel sensing through a CCA for both of the 20 MHz P-CH, the 20 MHz S-CH, and the 40 MHz S-CH before transmitting the mask frame having a size of 80 MHz. In addition, in case of supporting contiguous 160 MHz transmission or non-contiguous 160 MHz transmission, when the AP and/or the STA transmit a mask frame having a size of 160 MHz or 80 MHz+80 MHz by obtaining a transmission opportunity by waiting for PIFS or according to the EDCA, the AP and/or the STA must perform channel sensing through a CCA for both of the 20 MHz P-CH, the 20 MHz S-CH, the 40 MHz S-CH, and the 80 MHz S-CH before transmitting the mask frame.

In a MAC end for implementing WLAN communication implemented by the AP and/or the STA, information on a channel state written based on the CCA result can be delivered to a PHY end, and this can be delivered through a pre-defined primitive (more specifically, a PHY-CCA. indication primitive).

The information on the channel state can be implemented in a format of a channel list information element. The channel list information element may indicate a different meaning depending on a channel state. The meaning indicated by the channel list information element may be as follows.

TABLE 5

| Channel list information element | Description |
| --- | --- |
| Primary Channel | 20 MHz P-CH is in a busy state |
| Secondary Channel | 20 MHz S-CH is in a busy state |
| Tertiary Channel/ Quaternary Channel or | In case of T-CH/Q-CH, T-CH and/or Q-CH are in a busy data |
| 40 MHz Secondary Channel | In case of 40 MHz S-CH, 40 MHz S-CH are in a busy state |
| 80 MHz Secondary Channel | 80 MHz S-CH is in a busy state |

The primitive can be generated when the channel state changes during the channel sensing is performed through the CCA, and can be configured such that a data frame transmitted by the AP and/or the STA exists during a transmission period. Optionally, it can be generated in a different situation.

The channel list information element can be transmitted by the AP and/or the STA to an STA and/or AP in a receiving end.

If the channel list information element included in the primitive does not indicate the P-CH, the AP and/or the STA can transmit a frame having size of 20 MHz. If the channel list information element does not indicate the P-CH or does not indicate the P-CH and the S-CH, the AP and/or the STA can transmit a frame having a size of 20 MHz or a frame having a size of 40 MHz. If the channel list information element does not indicate the P-CH, or the P-CH and the S-CH, or the P-CH, the S-CH, and the 40 MHz S-CH, the AP and/or the STA can transmit a frame having a size of 20 MHz, 40 MHz, or 80 MHz.

Referring back to FIG. 21, the data frame transmitted by the AP and/or the STA includes a PLCP header and a data field. Transmission channel information can be included in the PLCP header. A transmission channel bandwidth and information on a P-CH, an S-CH, a T-CH, and a Q-CH is included in the transmission channel information. The information on the S-CH may be information indicating whether the S-CH is located in an upper channel or a lower channel than the P-CH. More specifically, the transmission channel information can be included in a VHT-SIG field of the PLCP header. In case of a transmission channel of a broader band than 80 MHz, for example, a WLAN system supporting a contiguous 160 MHz and 80 MHz+80 MHz transmission channel, transmission channel information based on the transmission channel bandwidth can be included.

As another type of transmission channel information, the transmission channel information may include information on a transmission channel bandwidth, a center frequency, and a P-CH. The transmission channel bandwidth information can indicate 20 MHz, 40 MHz, and 80 MHz, and in case of a WLAN system supporting transmission of 160 MHz or higher, can indicate a contiguous 160 MHz and non-contiguous 160 MHz (80 MHz+80 MHz).

In case of 20 MHz, 40 MHz, 80 MHz, and contiguous 160 MHz, the center frequency information can indicate a center frequency of a frequency band constituting a transmission channel. In case of non-contiguous 160 MHz, information indicating a center frequency of a $1^{st}$ frequency band and information indicating a center frequency of a 2nd frequency band can be included. In a detailed method for providing the center frequency information, a transmission channel starting frequency and a transmission channel center frequency index value can be provided. In this case, it can be related as "center frequency=transmission channel starting frequency+5*center frequency index". Likewise, the P-CH information can indicate a center frequency of the P-CH. Hereinafter, the transmission channel information included in the PLCP header may include at least one of the aforementioned two types.

When the AP and/or the STA transmit a data frame, the PLCP header can be transmitted through the P-CH and the data field can be transmitted through a full band of the transmission channel.

In a $2^{nd}$ period, a CCA result for a CH3 and a CH 4 is in a $2^{nd}$ period, and thus the AP cannot use the CH3 and the CH4 as a transmission channel and the AP and/or the STA can perform 40 MHz frame transmission by using the CH1 and the CH2. Therefore, the AP and/or the STA transmit transmission channel information to a reception STA and/or STA by including it into a PLCP header. When it is confirmed that the transmission channel consists of the CH1 and the CH2 by using the transmission channel information, the STA can receive a data frame through a transmission channel including the CH1 and the CH2.

In a $3^{rd}$ period, a CCA result for a CH1 selected as the existing S-CH is a busy state, and thus the AP cannot use the CH1. According to the conventional channel selection method, when the S-CH cannot be used, the AP and/or the STA can use only a 20 MHz transmission channel. However, if a channel adjacent to the P-CH is in an idle state, the 40 MHz transmission channel can be used if the adjacent channel in the idle state is used as the S-CH. Therefore, the present invention proposes a method in which the AP transmits information indicating that a channel selected as the S-CH changes to another state, i.e., the idle state, to the STA.

The AP can configure the S-CH information to indicate that the S-CH is an upper channel than the P-CH, and can transmit the information to the STA by including the information into a PLCP header. In this case, the STA can know that the S-CH is changed to the CH3. In addition, the AP can configure transmission channel information indicating a new center frequency with a 40 MHz bandwidth and can transmit the information by including the information into the PLCP header to the STA. In this case, the STA can know that the 40 MHz transmission channel has a frequency band configured by the CH2 and the CH3, and can receive a data frame through the transmission channel.

Therefore, even if the AP transmits the data field through the 40 MHz transmission channel including the CH2 and the CH3, the STA can receive the data field. As such, by using a method of selecting a channel by dynamically changing the channel, the AP can more effectively select the transmission channel and can improve an overall throughput of the WLAN system.

Although the channel change is achieved by the AP in the embodiment of FIG. 21, the channel change can also be implemented by using the data frame transmitted by the STA. The aforementioned embodiment can be implemented if the transmission channel information is included in the PLCP header of the frame transmitted by the STA.

Although changing of the transmission channel is implemented by including transmission channel information into a PLCP header of a data frame in the embodiment of FIG. 21, it can also be implemented by using a method in which transmission channel information is transmitted by including it into an association response frame, re-association response frame, probe response frame, beacon frame, and management/action frame transmitted by the AP to the STA.

Figure 22:
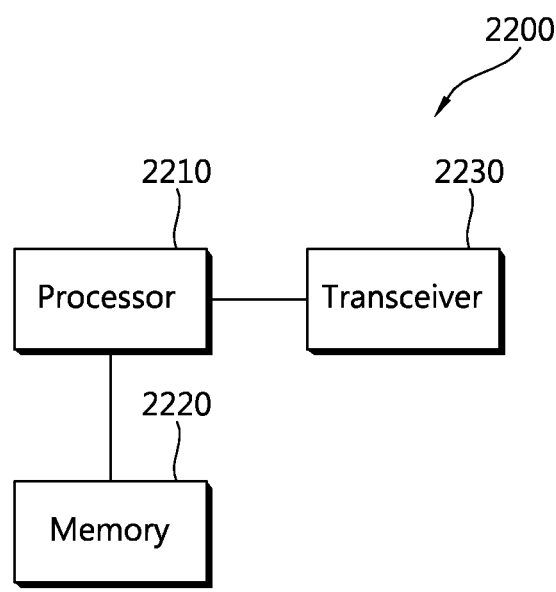
FIG. 22 is a block diagram showing a wireless apparatus for implementing an embodiment of the present invention.

FIG. 22 is a block diagram showing a wireless apparatus for implementing an embodiment of the present invention.

Referring to FIG. 22, a wireless apparatus 2200 includes a processor 2210, a memory 2220, and a transceiver 2230. The transceiver 2230 transmits and/or receives a radio signal, and implements an IEEE 802.11 PHY layer. The processor 2210 is operationally coupled to the transceiver 2230 and is configured to implement a MAC layer and/or PHY layer for implementing the embodiment of the present invention shown in FIG. 7 to FIG. 21 in which a data frame such as a PPDU format is transmitted, a transmission channel is selected, and the data frame is transmitted through the transport channel.

The processor 2210 and/or the transceiver 2230 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 2220 and may be performed by the processor 2210. The memory 2220 may be located inside or outside the processor 2210, and may be coupled to the processor 2210 by using various well-known means.

The invention claimed is:

1. A method of selecting, for a new basic service set (BSS), at least one channel from a set of channels in a wireless local area network, the method performed by an access point (AP) and comprising:
    selecting, for the new BSS, a primary channel from the set of channels, the set of channels having an operating channel width equal to one of 40 MHz, 80 MHz, 80+80 MHz or 160 MHz,
    wherein the step of selecting includes scanning the set of channels to search for one or more existing BSSs,
    wherein the selected primary channel is not identical to a secondary 20 MHz channel of one or more existing BSSs detected by the step of scanning, and
    wherein the secondary 20 MHz of the one or more existing BSSs detected by the step of scanning is contiguous with a primary 20 MHz channel of the one or more existing BSSs detected by the step of scanning.

2. The method of claim 1,
    wherein the set of channels have an operating channel width equal to one of 80+80 MHZ or 160 MHZ, and
    wherein the selected primary channel does not overlap with a secondary 40 MHZ channel of the one or more existing BSSs detected by the step of scanning.

3. The method of claim 1, wherein the selected primary channel is identical to the primary 20 MHz channel of the one or more existing BSSs detected by the step of scanning.

4. The method of claim 1, wherein the selected primary channel is not identical to the primary 20 MHz channel of the one or more existing BSSs detected by the step of scanning.

5. The method of claim 1,
    wherein the contiguous primary and secondary 20 MHz channels of the one or more existing BSSs detected by the step of scanning comprise a primary 40 MHz channel of the one or more existing BSSs, and
    wherein the primary 40 MHz channel of the one or more existing BSSs is contiguous with a secondary 40 MHz channel of the one or more existing BSSs.

6. The method of claim 5,
    wherein the contiguous primary and secondary 40 MHz channels of the one or more existing BSSs comprise a primary 80 MHz channel of the one or more existing BSSs, and
    wherein the primary 80 MHz channel of the one or more existing BSSs is contiguous with a secondary 80 MHz channel of the one or more existing BSSs.

7. The method of claim 6,
    wherein the contiguous primary and secondary 80 MHz channels of the one or more existing BSSs comprise one of a 160 MHz channel and a 80+80 MHz channel.

8. The method of claim 1, wherein the step of scanning is performed before starting the new BSS.

9. The method of claim 1, wherein the step of selecting, for the new BSS, a primary channel from the set of channels comprises:
    selecting a secondary channel for the new BSS.

10. The method of claim 1, wherein the selected primary channel comprises a 20 MHz primary channel.

11. A access point (AP) configured to select, for a new basic service set (BSS), at least one channel from a set of channels in a wireless local area network, the access point comprising:
    a transceiver; and
    a controller operatively connected to the transceiver and configured to
        perform a scan of the set of channels to search for one or more existing BSSs, and
        select, for the new BSS, a primary channel from the set of channels, the set of channels having an operating channel width equal to one of 40 MHz, 80 MHz, 80+80 MHz or 160 MHz,
        wherein the selected primary channel is not identical to a secondary 20 MHz channel of one or more existing BSSs detected by the scan, and
        wherein the secondary 20 MHz of the detected one or more existing BSSs is contiguous with a primary 20 MHz channel of the detected one or more existing BSSs.

12. The access point of claim 11,
    wherein the set of channels have an operating channel width equal to one of 80+80 MHZ or 160 MHZ, and
    wherein the selected primary channel does not overlap with a secondary 40 MHZ channel of the one or more existing BSSs detected by the scan.

13. The access point of claim 11, wherein the selected primary channel is identical to the primary 20 MHz channel of the one or more existing BSSs detected by the scan.

14. The access point of claim 11, wherein the selected primary channel is not identical to the primary 20 MHz channel of the one or more existing BSSs detected by the scan.

15. The access point of claim 11,
    wherein the contiguous primary and secondary 20 MHz channels of the one or more existing BSSs detected by the scan comprise a primary 40 MHz channel of the one or more existing BSSs, and
    wherein the primary 40 MHz channel of the one or more existing BSSs is contiguous with a secondary 40 MHz channel of the one or more existing BSSs.

16. The access point of claim 15,
    wherein the contiguous primary and secondary 40 MHz channels of the one or more existing BSSs comprise a primary 80 MHz channel of the one or more existing BSSs, and
    wherein the primary 80 MHz channel of the one or more existing BSSs is contiguous with a secondary 80 MHz channel of the one or more existing BSSs.

17. The access point of claim 16,
    wherein the contiguous primary and secondary 80 MHz channels of the one or more existing BSSs comprise one of a 160 MHz channel and a 80+80 MHz channel.

18. The access point of claim 11, wherein the controller is configured to perform the scan of the set of channels to search for the one or more existing BSSs before starting the new BSS.

19. The access point of claim 11, wherein the controller is configured to select a secondary channel for the new BSS.

20. The access point of claim 11, wherein the selected primary channel comprises a 20 MHz primary channel.

* * * * *